(12) United States Patent
Sciortino et al.

(10) Patent No.: US 10,524,451 B1
(45) Date of Patent: Jan. 7, 2020

(54) ADJUSTABLE ELEVATION PET FOOD FEEDER MECHANISM DEVICE AND CONTROL SYSTEM

(71) Applicant: Salvatore Sciortino, Levittown, NY (US)

(72) Inventors: Salvatore Sciortino, Levittown, NY (US); Andrew Martin, Bayport, NY (US); Christopher Montalbano, Huntington, NY (US); Gregory Montalbano, Huntington, NY (US)

(73) Assignee: Salvatore Sciortino, Levittown, NY (US)

( * ) Notice: Subject to any disclaimer, the term of this patent is extended or adjusted under 35 U.S.C. 154(b) by 0 days.

(21) Appl. No.: 16/179,172

(22) Filed: Nov. 2, 2018

(51) Int. Cl.
*A01K 5/01* (2006.01)

(52) U.S. Cl.
CPC .................................. *A01K 5/0135* (2013.01)

(58) Field of Classification Search
CPC .................................................... A01K 5/0114
See application file for complete search history.

(56) References Cited

U.S. PATENT DOCUMENTS

| | | | | |
|---|---|---|---|---|
| 4,232,901 A | * | 11/1980 | Harrington | A47C 16/025 108/147 |
| 4,511,110 A | * | 4/1985 | Moller | B66F 7/0658 108/147 |
| 4,658,759 A | * | 4/1987 | Brown | A01K 5/0114 119/61.5 |
| 4,976,223 A | * | 12/1990 | Pierce | A01K 5/0114 119/61.56 |
| 5,054,431 A | * | 10/1991 | Coviello | A01K 5/0114 119/51.01 |
| 5,285,992 A | * | 2/1994 | Brown | B66F 7/0608 108/147 |
| 5,501,176 A | * | 3/1996 | Tully | A01K 5/0114 119/61.57 |
| 5,584,263 A | * | 12/1996 | Sexton | A01K 5/0114 119/51.5 |
| 7,318,391 B2 | | 1/2008 | Brillon | |
| 8,082,883 B2 | | 12/2011 | Aletti | |
| 8,479,686 B2 | | 7/2013 | Johnson | |

(Continued)

*Primary Examiner* — Joshua D Huson
(74) *Attorney, Agent, or Firm* — Carter, DeLuca & Farrell LLP; George Likourezos

(57) ABSTRACT

A pet food device includes a pet food bowl supporting tray configured to support at least one pet food bowl, an actuating mechanism supporting tray, and an actuating mechanism disposed within the actuating mechanism supporting tray in operable communication with the pet food bowl supporting tray. Additionally, the actuating mechanism enables elevating concurrently the pet food bowl supporting tray above the actuating mechanism supporting tray and at least one of a plurality of telescoping shields which shield the actuating mechanism supporting tray from the environs and enables lowering concurrently the pet food bowl supporting tray and the plurality of telescoping shields to interface with the supporting tray. A pet food device may also include as an actuating mechanism a scissor lift movable structure in operable communication with the pet food bowl supporting tray and with the actuating mechanism to cause elevating and lowering of the pet food bowl supporting tray.

20 Claims, 34 Drawing Sheets

(56) References Cited

U.S. PATENT DOCUMENTS

| | | | | |
|---|---|---|---|---|
| 8,776,725 | B1* | 7/2014 | Grijalva | A01K 7/00 |
| | | | | 119/51.01 |
| 8,888,070 | B2* | 11/2014 | Olesen | A61G 5/1059 |
| | | | | 187/211 |
| 9,144,225 | B1* | 9/2015 | Gaccione | A01K 7/00 |
| 9,288,967 | B1* | 3/2016 | Wampler | A01K 7/00 |
| 10,052,764 | B2* | 8/2018 | Chelian | B25J 9/1664 |
| 10,098,321 | B2* | 10/2018 | McKay | A01K 7/00 |
| 10,149,456 | B2* | 12/2018 | Diamond | A01K 5/0114 |
| 2006/0075974 | A1* | 4/2006 | Kennedy | A01K 5/0142 |
| | | | | 119/61.5 |
| 2006/0272893 | A1* | 12/2006 | Foggio | A47C 16/025 |
| | | | | 182/69.1 |
| 2007/0089678 | A1* | 4/2007 | Greenwood | A01K 5/0114 |
| | | | | 119/61.5 |
| 2008/0023479 | A1* | 1/2008 | Sadriwalla | A01K 5/0114 |
| | | | | 220/480 |
| 2008/0035066 | A1* | 2/2008 | Enriquez | A01K 5/0114 |
| | | | | 119/61.5 |
| 2010/0147224 | A1* | 6/2010 | Aletti | A01K 5/0114 |
| | | | | 119/61.57 |
| 2015/0308615 | A1* | 10/2015 | Neaves | A01K 5/0114 |
| | | | | 119/61.57 |
| 2015/0313176 | A1* | 11/2015 | Gelinas | B66F 3/08 |
| | | | | 119/51.5 |
| 2016/0242385 | A1* | 8/2016 | Parness | A01K 5/0114 |
| 2016/0316715 | A1* | 11/2016 | Diamond | F16M 11/24 |

* cited by examiner

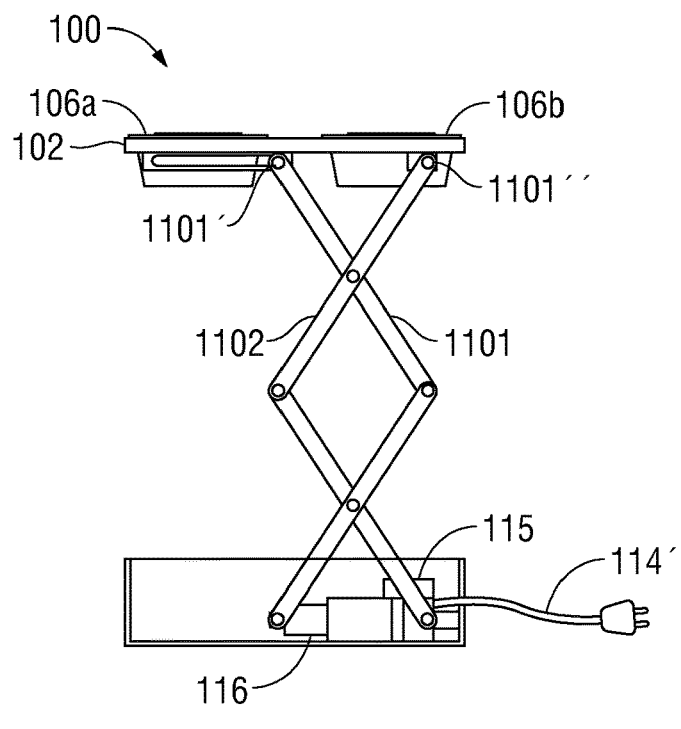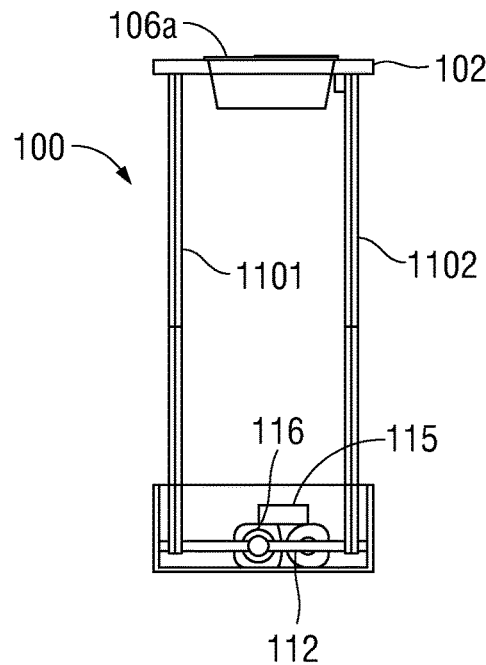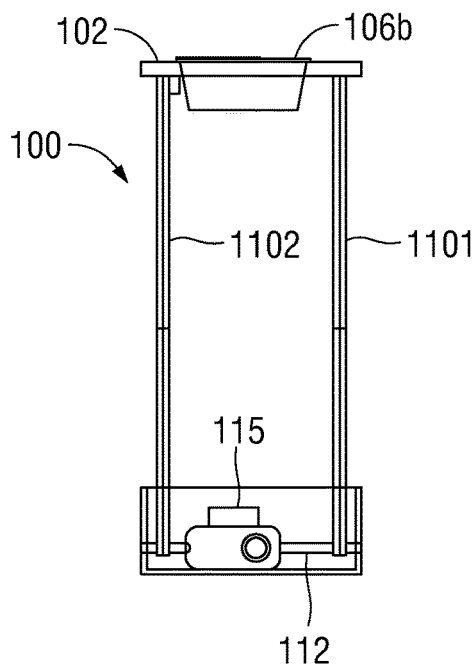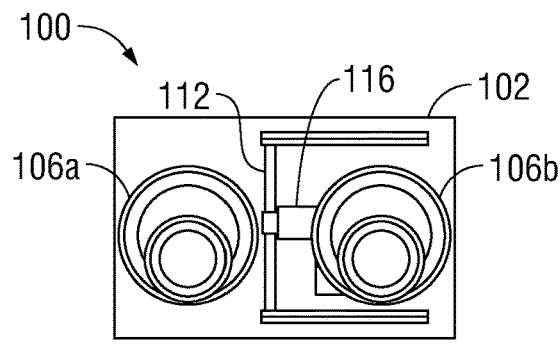
FIG. 5
FIG. 6
FIG. 7
FIG. 8

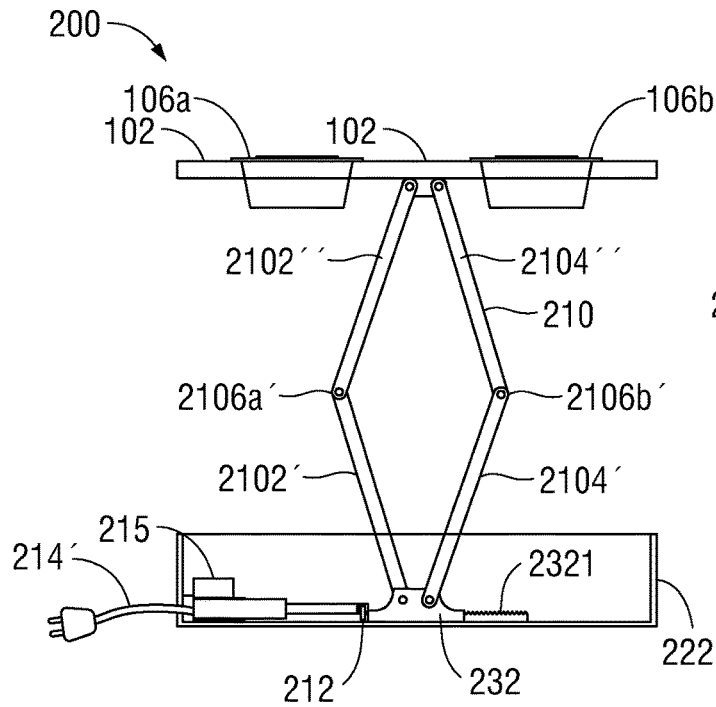
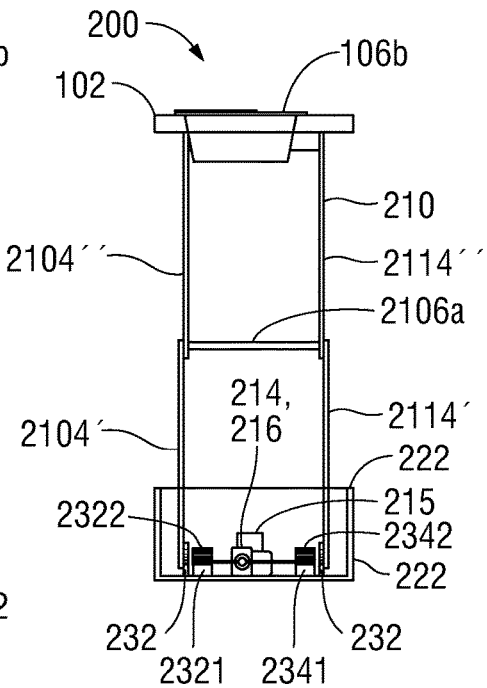
FIG. 15
FIG. 16
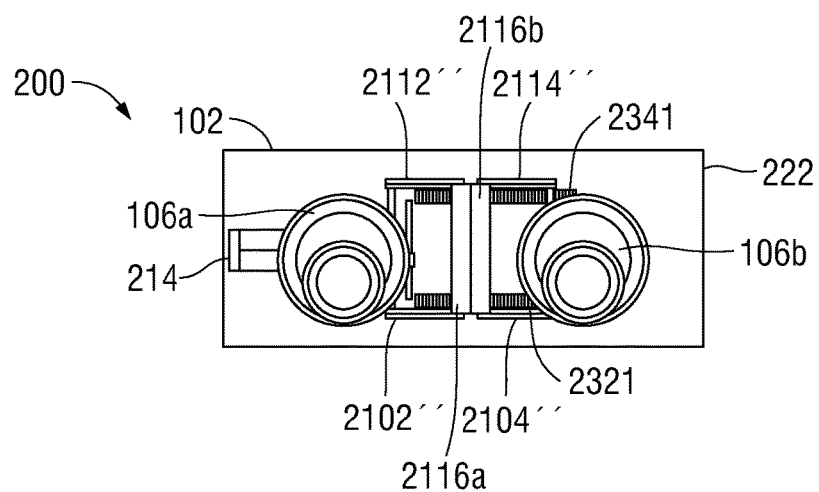
FIG. 17

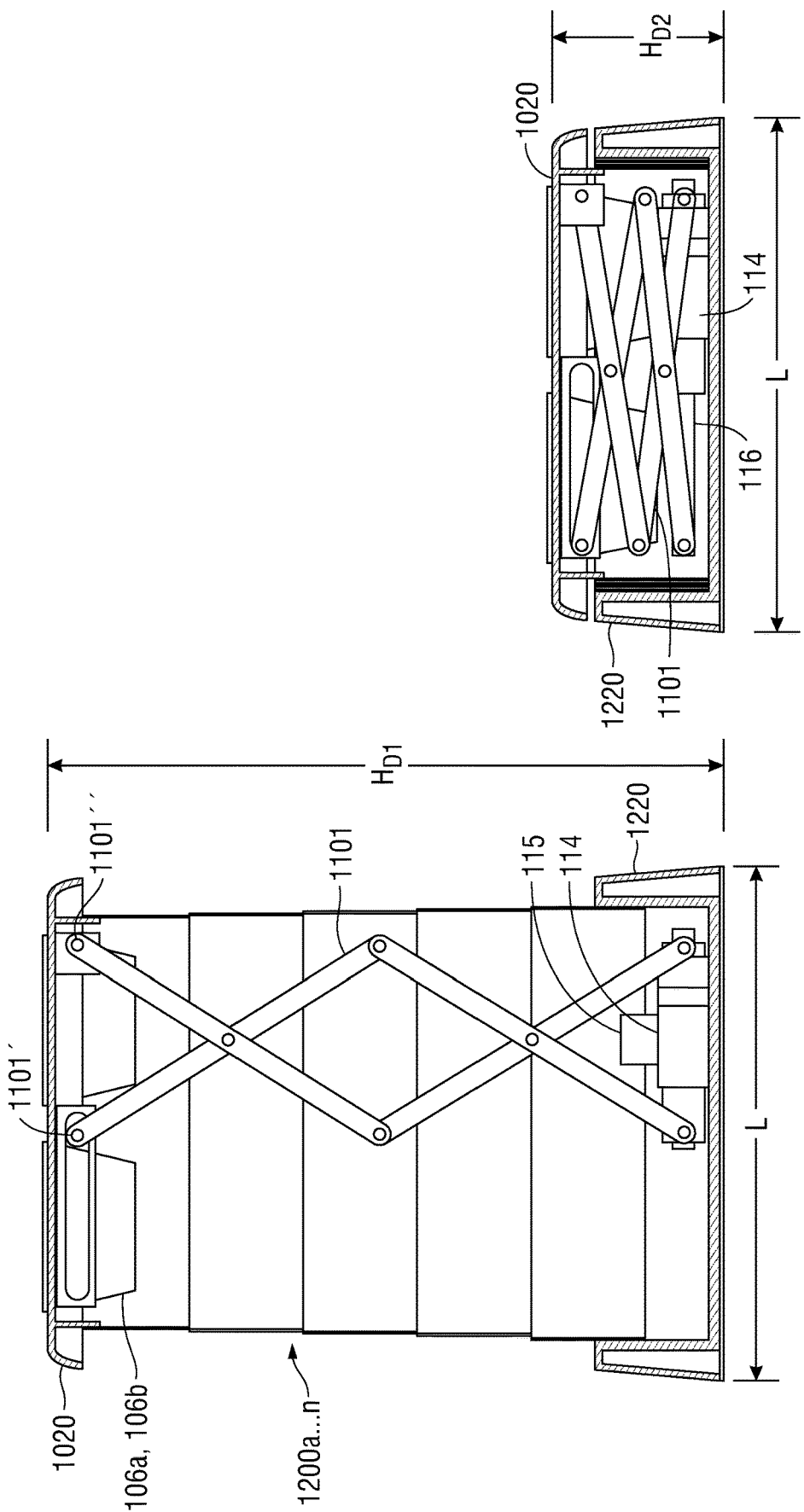

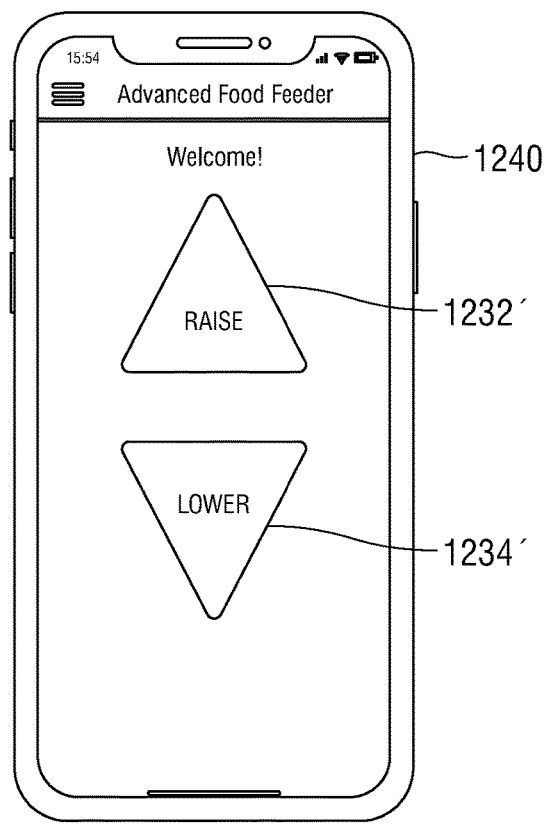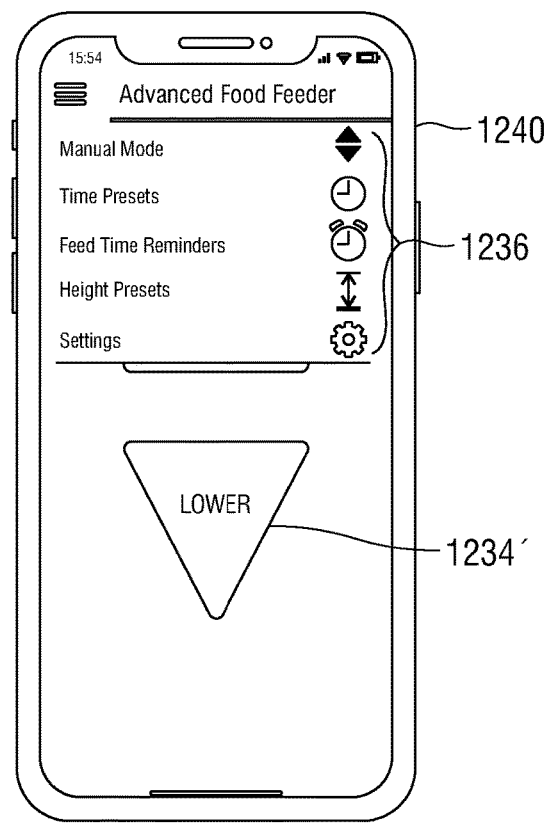
FIG. 48   FIG. 49

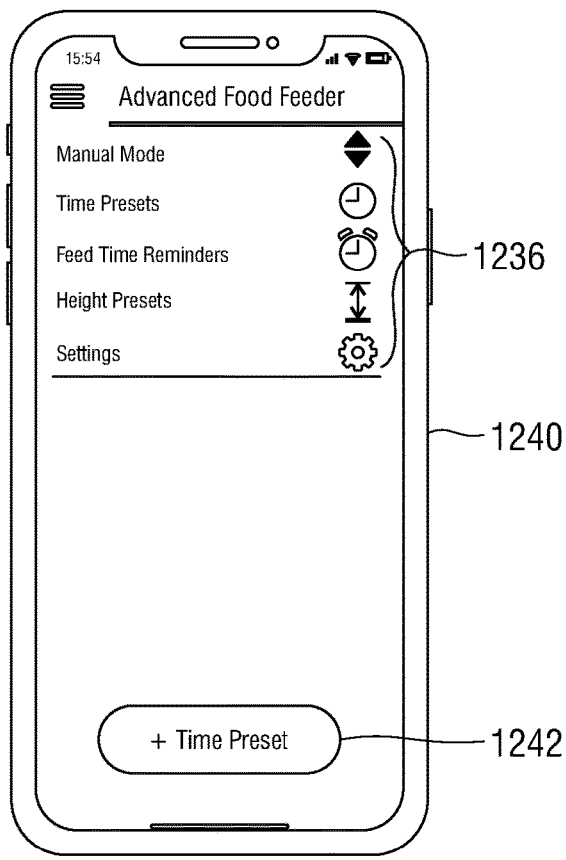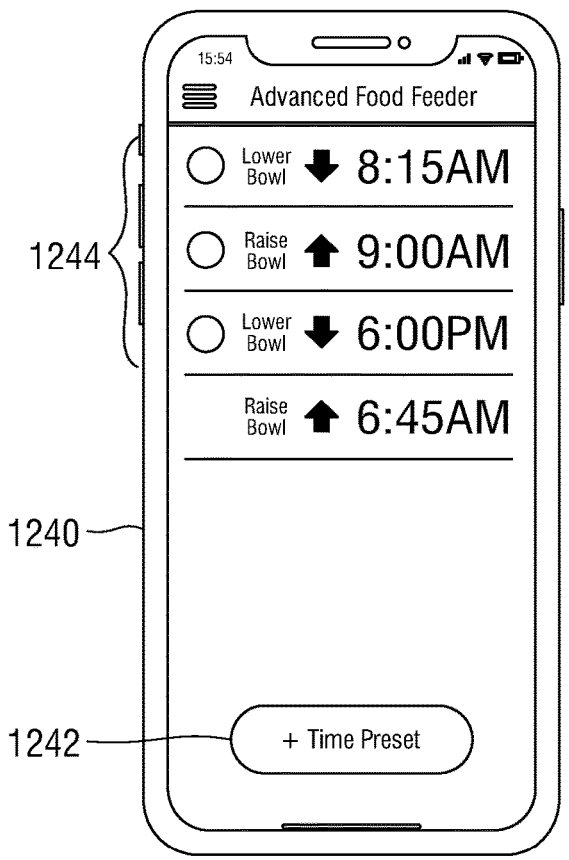
FIG. 50   FIG. 51

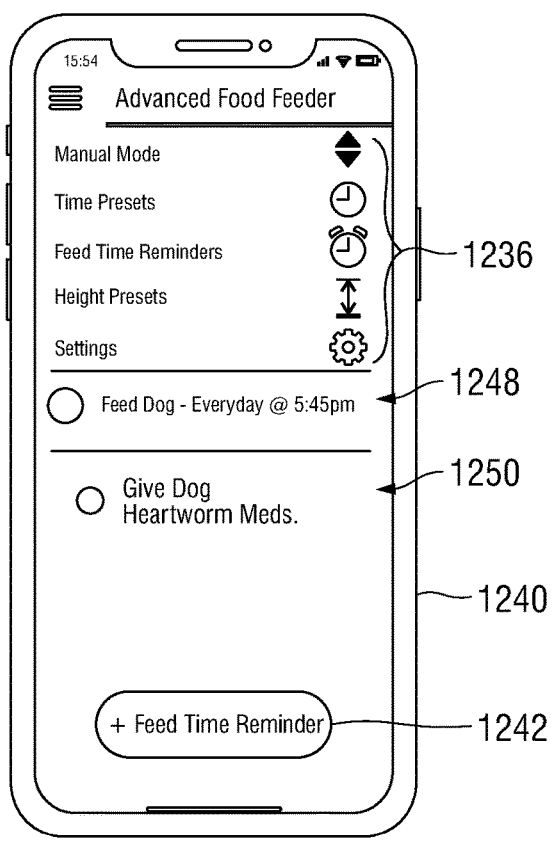 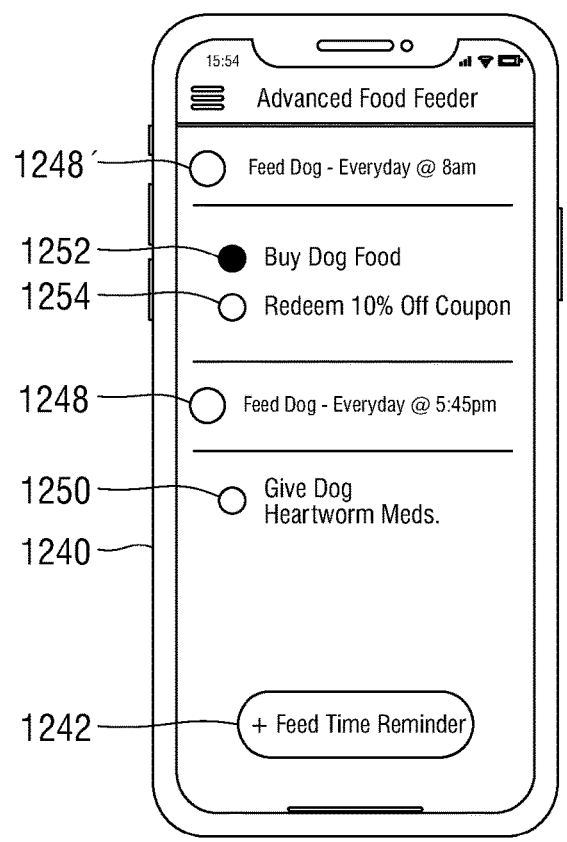
FIG. 52  FIG. 53

ADJUSTABLE ELEVATION PET FOOD FEEDER MECHANISM DEVICE AND CONTROL SYSTEM

BACKGROUND

1. Technical Field

The present disclosure relates to pet food feeding devices.

2. Discussion of Related Art

Pet food devices that automatically dispense food and water at a specified time are known in the art. Such devices remain at a particular elevation such as at the floor level or on a countertop, etc. and thus do not accommodate the needs of elderly or disabled pet owners who cannot easily bend down and return to a normal standing position.

Pet food devices that elevate and lower pet food bowls are known in the art but such devices do not protect against damage and interference in operation caused by the pet such as by chewing. The operating mechanisms can be exposed not only to the pet but also to pet food and other debris.

In addition, the rate of elevating and lowering of the pet food bowls may be too slow to satisfy either the wishes or needs of the user. The footprint of the devices may be large thereby taking up needed space in the location of use.

SUMMARY

In view of the foregoing, the present disclosure relates to aspects of a pet food device that provides significant and non-obvious advantages over the prior art of pet food devices that elevate and lower pet food bowls by protecting against damage and interference in operation caused by the pet such as by chewing such as to the operating mechanisms of such devices which can be exposed not only to the pet but also to pet food and other debris.

In addition, the present disclosure relates to aspects of a pet food device wherein the rate of elevating and lowering of the pet food bowls is sufficiently rapid to satisfy either the wishes or needs of the user and wherein the footprint of the devices is minimized thereby freeing up needed space in the location of use.

More particularly, the present disclosure relates to a pet food device that includes a pet food bowl supporting tray configured to support at least one pet food bowl, an actuating mechanism supporting tray, and an actuating mechanism disposed within the actuating mechanism supporting tray in operable communication with the pet food bowl supporting tray. Additionally, the actuating mechanism enables elevating concurrently the pet food bowl supporting tray above the actuating mechanism supporting tray and at least one of a plurality of telescoping shields which are configured and disposed to shield the actuating mechanism supporting tray from the environs and enables lowering concurrently the pet food bowl supporting tray and the plurality of telescoping shields to interface with the actuating mechanism supporting tray.

In an aspect, the actuating mechanism includes a scissor lift movable structure in operable communication with the pet food bowl supporting tray and with the actuating mechanism, the scissor lift movable structure and the actuating mechanism effecting thereby the elevating of and lowering of the pet food bowl supporting tray.

In an aspect, the actuating mechanism includes a linear actuator in operable communication with a connecting rod member and wherein the connecting rod member is in operable communication with the scissor lift movable structure wherein movement of the connecting rod member by the linear actuator effects the elevating of and lowering of the pet food bowl supporting tray.

In an aspect, the actuating mechanism effects the elevating of and lowering of the pet food bowl supporting tray in a height dimension over a period of time in a time dimension to define a minimum velocity of elevating and lowering the pet food bowl supporting tray of at least 3 centimeters/second (cm/sec).

In an aspect, the actuating mechanism supporting tray is configured with an average area of length multiplied by width and wherein the average area divided by the minimum velocity of elevating and lowering the pet food bowl supporting tray is not greater than 900 centimeter-seconds.

In an aspect, the actuating mechanism includes a jack lift movable structure in operable communication with the pet food bowl supporting tray.

In an aspect, the actuating mechanism includes the jack lift movable structure in operable communication with the pet food bowl supporting tray and a rack and pinion movable structure in operable communication with the jack lift movable structure and with the actuating mechanism effecting thereby the elevating of and lowering of the pet food bowl supporting tray.

In an aspect, the actuating mechanism includes a linear actuator in operable communication with a connecting rod member in operable communication with the rack and pinion movable structure wherein movement of the connecting rod member by the linear actuator effects the elevating of and lowering of the pet food bowl supporting tray.

In an aspect, the actuating mechanism includes the jack lift movable structure in operable communication with the pet food bowl supporting tray and motorized gears in operable communication with the jack lift movable structure, the jack lift movable structure and the motorized gears effecting thereby the elevating of and lowering of the pet food bowl supporting tray.

In an aspect, the actuating mechanism includes a riser panel supported by the actuating mechanism supporting tray.

In an aspect, the pet food bowl supporting tray is movably supported by a support connector member slidably disposed in a channel defined by a vertical edge of the riser panel.

In an aspect, the support connector member is operably coupled to a chain link and gear set configured to enable the support connector member to slide in the channel effecting thereby the elevating of and lowering of the pet food bowl supporting tray.

In an aspect, the pet food bowl supporting tray is movably supported by a support connector member slidably disposed in a channel defined by a guide structure mounted on or formed by the riser panel.

In an aspect, the support connector member is operably coupled to a belt and pulley mechanism configured to enable the support connector member to slide in the channel effecting thereby the elevating of and lowering of the pet food bowl supporting tray.

In an aspect, the actuating mechanism supporting tray defines an inner periphery, and the pet food device includes the plurality of telescoping shields configured as sequentially interlocking panels extending around the inner periphery of the actuating mechanism supporting tray, the first of the plurality of telescoping shields configured to interface with the inner periphery of the actuating mechanism supporting tray, the first of the plurality of telescoping shields defining an inner surface, the second of the plurality of telescoping shields extending around the inner surface of the first of the plurality of telescoping shields and each subsequent telescoping shield extending around the inner surface of the prior telescoping shield, the final telescoping shield extending to contact the pet food bowl supporting tray.

In an aspect, the plurality of telescoping shields each define a gap in extending around the inner surface of the prior telescoping shield, and the pet food device includes a plurality of connectors corresponding to the plurality of telescoping shields, wherein the plurality of connectors are each configured to span the gap in extending around the inner surface of the prior telescoping shield, and wherein the connectors are configured as linear guides that guide the telescoping shields to extend from a lowered position of the pet food device to an elevated position of the pet food device.

In an aspect, the actuating mechanism supporting tray includes at least one anti-tipping structure configured to provide resistance to overturning of the pet food device.

In an aspect, the pet food device includes a power supply to the actuating mechanism including a power control switch; and a radio-frequency receiver in communication with the power control switch to enable control of the actuating mechanism via a radio-frequency transmitter communicating a signal to the power control switch via the radio-frequency receiver to at least partially elevate or at least partially lower the pet food bowl supporting tray.

In an aspect, the pet food device includes a power supply to the actuating mechanism including a power control switch; and a computing device including a processor and a memory storing instructions which, when executed by at least one processor, causes the computing device to communicate instructions to a radio-frequency receiver in communication with the power control switch to enable control of the actuating mechanism by communicating a signal to the power control switch via the radio-frequency receiver to at least partially elevate or at least partially lower the pet food bowl supporting tray.

In an aspect, the pet food device includes wherein the computing device including the processor and the memory store instructions which, when executed by at least one processor, causes the computing device to establish one of time presets or feed time reminders or height presets or settings or combinations thereof.

In an aspect, the pet food device includes wherein the time presets include one of at least one time to elevate the pet food bowl supporting tray or to lower the pet food bowl supporting tray or combinations thereof.

In an aspect, the pet food device includes wherein the feed time reminders include at least one time to feed a pet or at least one time to provide medications to a pet or at least one time to procure pet food or combinations thereof.

The present disclosure relates also to a pet food device that includes a pet food bowl supporting tray configured to support at least one pet food bowl, an actuating mechanism supporting tray, and an actuating mechanism disposed within the actuating mechanism supporting tray in operable communication with the pet food bowl supporting tray. The actuating mechanism enables elevating the pet food bowl supporting tray above the actuating mechanism supporting tray and lowering the pet food bowl supporting tray to interface with the actuating mechanism supporting tray, and the actuating mechanism includes a scissor lift movable structure in operable communication with the pet food bowl supporting tray and with the actuating mechanism, wherein the scissor lift movable structure and the actuating mechanism effect thereby the elevating of and lowering of the pet food bowl supporting tray.

In an aspect, the pet food device includes wherein the actuating mechanism includes a linear actuator in operable communication with a connecting rod member and the connecting rod member is in operable communication with the scissor lift movable structure wherein movement of the connecting rod member by the linear actuator effects the elevating of and lowering of the pet food bowl supporting tray.

In an aspect, the actuating mechanism effects the elevating of and lowering of the pet food bowl supporting tray in a height dimension over a period of time in a time dimension to define a minimum velocity of elevating and lowering the pet food bowl supporting tray of at least 3 centimeters/second (cm/sec).

In an aspect, the pet food device includes wherein the actuating mechanism supporting tray is configured with an average area of length multiplied by width and wherein the average area divided by the minimum velocity of elevating and lowering the pet food bowl supporting tray is not greater than 900 centimeter-seconds.

In an aspect, the pet food device includes wherein the actuating mechanism enables elevating concurrently the pet food bowl supporting tray above the actuating mechanism supporting tray and at least one of a plurality of telescoping shields which are configured and disposed to shield the actuating mechanism supporting tray from the environs and enables lowering concurrently the pet food bowl supporting tray and the at least one of the plurality of telescoping shields to interface with the actuating mechanism supporting tray.

In an aspect, the pet food device includes wherein the actuating mechanism supporting tray defines an inner periphery, and the pet food device including the plurality of telescoping shields configured as sequentially interlocking panels extending around the inner periphery of the actuating mechanism supporting tray, the first of the plurality of telescoping shields configured to interface with the inner periphery of the actuating mechanism supporting tray, the first of the plurality of telescoping shields defining an inner surface, the second of the plurality of telescoping shields extending around the inner surface of the first of the plurality of telescoping shields and each subsequent telescoping shield extending around the inner surface of the prior telescoping shield, the final telescoping shield extending to contact the pet food bowl supporting tray.

In an aspect, the pet food device includes wherein the plurality of telescoping shields each define a gap in extending around the inner surface of the prior telescoping shield, and the pet food device including a plurality of connectors corresponding to the plurality of telescoping shields, the plurality of connectors each configured to span the gap in extending around the inner surface of the prior telescoping shield, wherein the connectors are configured as linear guides that guide the telescoping shields to extend from a lowered position of the pet food device to an elevated position of the pet food device.

In an aspect, the actuating mechanism supporting tray includes at least one anti-tipping structure configured to provide resistance to overturning of the pet food device.

BRIEF DESCRIPTION OF THE DRAWINGS

The above-mentioned advantages and other advantages will become more apparent from the following detailed description of the various exemplary embodiments of the present disclosure with reference to the drawings wherein:

FIG. 5 is a front elevation view of the adjustable elevation pet food feeder mechanism of FIG. 4 in an elevated position;

FIG. 6 is a side elevation view of the adjustable elevation pet food feeder mechanism of FIG. 5 in an elevated position;

FIG. 7 is another side elevation view of the adjustable elevation pet food feeder mechanism of FIG. 2 in an elevated position on a side opposite to the side of FIG. 6;

FIG. 8 is a top plan view of the adjustable elevation pet food feeder mechanism of FIGS. 4-7 when in an elevated position;

FIG. 15 is a front elevation view of the adjustable elevation pet food feeder mechanism of FIG. 13 in an elevated position;

FIG. 16 is a side elevation view of the adjustable elevation pet food feeder mechanism of FIG. 13 in an elevated position;

FIG. 17 is a top plan view of the adjustable elevation pet food feeder mechanism of FIGS. 14-16 when in an elevated position;

FIG. 37 is a front elevation cross-sectional view in an elevated position of the adjustable elevation pet food feeder mechanism of FIGS. 34-36;

FIG. 38 is a front elevation cross-sectional view in a lowered position of the adjustable elevation pet food feeder mechanism of FIGS. 34-37;

FIG. 48 is a view of a mobile device having a software application which enables raising and lowering the adjustable elevation pet food feeders of FIGS. 1-46 according to an aspect of the present disclosure;

FIG. 49 is a view of the mobile device of FIG. 48 illustrating specific actuation features enabled by the software application;

FIG. 50 is a view of the mobile device of FIG. 49 wherein the user has selected to adjust the specific actuation features enabled by the software application;

FIG. 51 is view of time settings for the software application to lower and raise the adjustable elevation pet food feeders of FIGS. 1-46;

FIG. 52 is a view of additional settings for the software application to feed a pet or give medications; and FIG. 53 is a view of additional settings enabled by the software application to purchase pet food.

DETAILED DESCRIPTION

Figure 1:
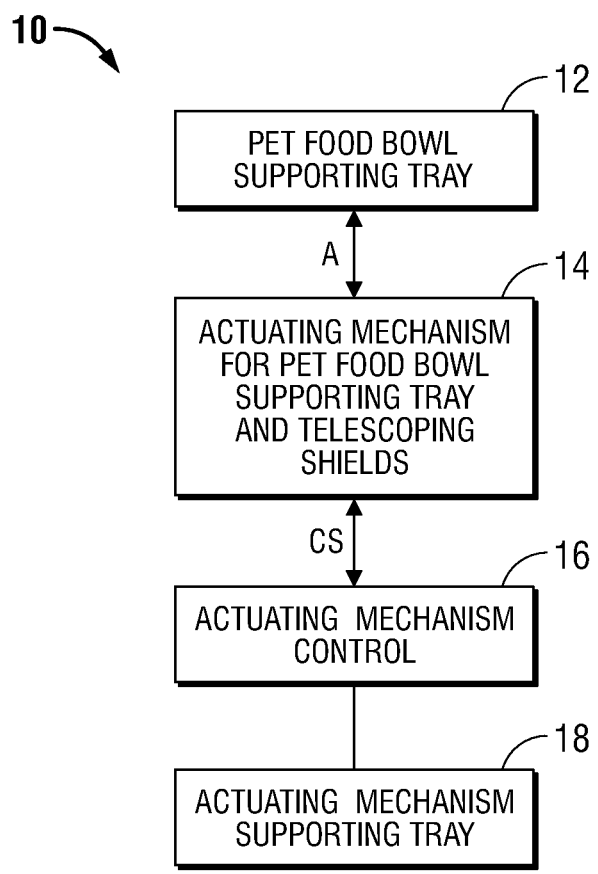
FIG. 1 is illustrates a generalized schematic of a pet food device according to an aspect of the present disclosure.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

The word "exemplary" is used herein to mean "serving as an example, instance, or illustration." Any embodiment described herein as "exemplary" is not necessarily to be construed as preferred or advantageous over other embodiments.

It is to be understood that the method steps described herein need not necessarily be performed in the order as described. Further, words such as "thereafter," "then," "next," etc., are not intended to limit the order of the steps. Such words are simply used to guide the reader through the description of the method steps.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, tablets, portable/personal digital assistants, and other devices that facilitate communication of information between end-users within a network.

The general features and aspects of the present disclosure remain generally consistent regardless of the particular purpose. Further, the features and aspects of the present disclosure may be implemented in system in any suitable fashion, e.g., via the hardware and software configuration of system or using any other suitable software, firmware, and/or hardware. For instance, when implemented via executable instructions, such as the set of instructions, various elements of the present disclosure are in essence the code defining the operations of such various elements. The executable instructions or code may be obtained from a computer-readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media may include any medium that may store or transfer information.

In the Summary section above, in this Detailed Description, in the Claims below, and in the accompanying drawings, reference is made to particular features (including method steps or acts) of the present disclosure. It is to be understood that the disclosure in this specification includes combinations of parts, features, or aspects disclosed herein. For example, where a particular feature is disclosed in the context of a particular aspect or embodiment of the present disclosure, or a particular claim, that feature can also be used, to the extent possible, in combination with and/or in the context of other particular aspects and embodiments of the present disclosure, and in the disclosure generally.

The term "comprises" and grammatical equivalents thereof are used herein to mean that other components, ingredients, steps, acts, etc. are optionally present. For example, an article "comprising (or "which comprises") component A, B, and C can consist of (i.e., contain only) components A, B, and C, or can contain not only components, A, B, and C but also one or more additional components, elements, features, ingredients, steps, acts, etc.

Where reference is made herein to a method comprising two or more defined steps or acts, the defined steps or acts can be carried out in any order or simultaneously (except where the context excludes that possibility); and the method can include one or more other steps or acts which are carried out before any of the defined steps or acts, between two of the defined steps or acts, or after all the defined steps or acts (except where the context excludes that possibility).

When, in this specification, a range is given as "(a first number) to (a second number)" or "(a first number) (a second number)," this means a range whose lower limit is the first number and whose upper limit is the second number. For example, 25 to 100 mm means a range whose lower limit is 25 mm, and whose upper limit is 100 mm.

With reference to the drawings, FIG. 1 illustrates a generalized schematic of a pet food device 5 according to an aspect of the present disclosure. The pet food device 5 may include a pet food bowl supporting tray 12 that is configured to support at least one pet food bowl, an actuating mechanism supporting tray 18; and an actuating mechanism 14 disposed within the actuating mechanism supporting tray 18 that is in operable communication with the pet food bowl supporting tray 12. In addition, as explained in more detail with respect to FIGS. 34-46 below, via coupling to the pet food bowl supporting tray 12, the actuating mechanism 14 may also be in operable communication with telescoping shields 1200a . . . 1200n that extend or descend upon actuating the pet food bowl supporting tray 12 by the actuating mechanism 14.

More particularly, the actuating mechanism 14 enables elevating concurrently the pet food bowl supporting tray 12 above the actuating mechanism supporting tray 18 and at least one of or each of a plurality of telescoping shields 1200a . . . 1200n which are configured and disposed to shield the actuating mechanism supporting tray 18 from the environs and also enables lowering concurrently the pet food bowl supporting tray 12 and at least one of or each of the plurality of telescoping shields 1200a . . . 1200n to interface with the actuating mechanism supporting tray 18.

Consequently, the actuating mechanism 14 enables elevating the pet food bowl supporting tray 12 above the actuating mechanism supporting tray 18 in the direction of arrow A and lowering the pet food bowl supporting tray 12 in the direction of arrow A to interface with the actuating mechanism supporting tray 18. An actuating mechanism control 16 receives control signals CS from a source controller (not shown) wherein the control signals CS are transmitted to the actuating mechanism 14 to effect the elevating of and lowering of the pet food bowl supporting tray 12.

Figure 2:
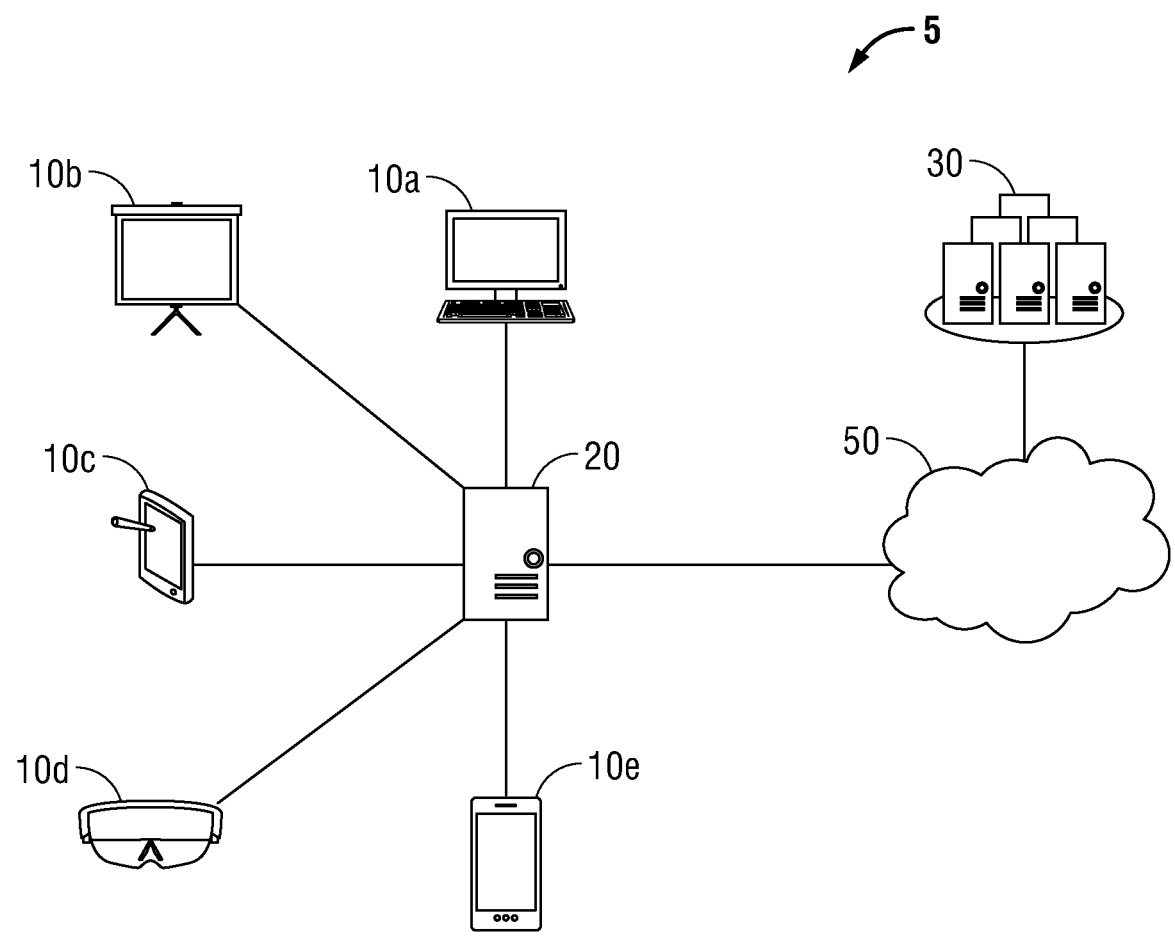
FIG. 2 is a simplified diagram of a system for creating and viewing renderings of control functions relating to control of the pet food device according to an aspect of the present disclosure.

FIG. 2 shows an exemplary system 55 for creating a rendering of real-world locations with multimedia elements embedded therein. System 55 may include, among other things, a user device 10 including a display, and a computing device 20 connected to a server 30 via a network 50.

User device 10 may be any of a variety of user devices which may be configured to display images. In aspects, user device 10 may be a computer 10a, a television or image projection system 10b, a tablet 10c, a virtual reality or augmented reality device 10d, a smartphone 10e, and/or any other devices known to those skilled in the art which may be configured to display images.

Computing device 20 may be any computer, server, processor, or other multiples or combinations of the same, which may be configured to receive image data and multimedia elements, analyze and process such image data and multimedia elements, and generate images including the rendering of a real-world location with the multimedia elements embedded therein. While shown in FIG. 1 and described herein as a separate device from user device 10, it is envisioned that computing device 20 and user device 10 may be a single device configured to perform the functions of both computing device 20 and user device 10. Alternatively, computing device 20 may be a server located remotely from user device 10 and may send a fully generated rendering to user device 10 to simply be displayed by user device 10.

Server 30 may be any server or array of servers used by social media platforms to store multimedia elements. For example, server 30 may be a server used by a social network, such as FACEBOOK®, TWITTER®, INSTAGRAM®, etc., to store multimedia elements associated with user profiles on the social network. Similarly, server 30 may be a server used by media organizations, other multimedia content aggregators, or individual websites that make the multimedia elements stored on their servers available for use by the public.

Network 50 may be any network or collection of networks used to connect computing device 20 to server 30. In an aspect, user device 10 may also be connected to computing device 20 and/or server 30 via network 50. Network 50 may include local area networks (LANs) consisting of wired and/or wireless networks, wide area networks (WANs), a wireless mobile network, a BLUETOOTH® network, and/or the internet.

Turning now to FIG. 2, there is shown a simplified block diagram of computing device 20. Computing device 20 may include a memory 21, a processor 24, a display 26, a network interface 25, an input device 27, and/or an output module 28. Memory 21 may store application 23 and/or a database 22.

Database 22 may store, among other things, image data and/or multimedia elements. Application 23 may, when executed by processor 24, cause display 26 to present user interface 23a.

Memory 21 may include any non-transitory computer-readable storage media for storing data and/or software that is executable by processor 24 and which controls the operation of computing device 20. In an aspect, memory 21 may include one or more solid-state storage devices such as flash memory chips. Alternatively or in addition to the one or more solid-state storage devices, memory 21 may include one or more mass storage devices connected to the processor 24 through a mass storage controller (not shown) and a communications bus (not shown). Although the description of computer-readable media contained herein refers to a solid-state storage, it should be appreciated by those skilled in the art that computer-readable storage media can be any available media that can be accessed by the processor 24. That is, computer readable storage media includes non-transitory, volatile and non-volatile, removable and non-removable media implemented in any method or technology for storage of information such as computer-readable instructions, data structures, program modules or other data. For example, computer-readable storage media includes RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by computing device 20.

Processor 24 may be any single or collection of processors. In aspects, processor 24 may be a central processing unit (CPU) configured to control computing device 20. In further aspects, processor 24 may be a dedicated graphical processing unit (GPU) specialized to perform graphics processing. Network interface 25 may be configured to connect to a network such as network 50. Input device 27 may be any device by means of which a user may interact with computing device 20, such as, for example, a mouse, keyboard, foot pedal, touch screen, and/or voice interface. Output module 28 may include any connectivity port or bus, such as, for example, parallel ports, serial ports, universal serial busses (USB), or any other similar connectivity port known to those skilled in the art.

Figure 4:
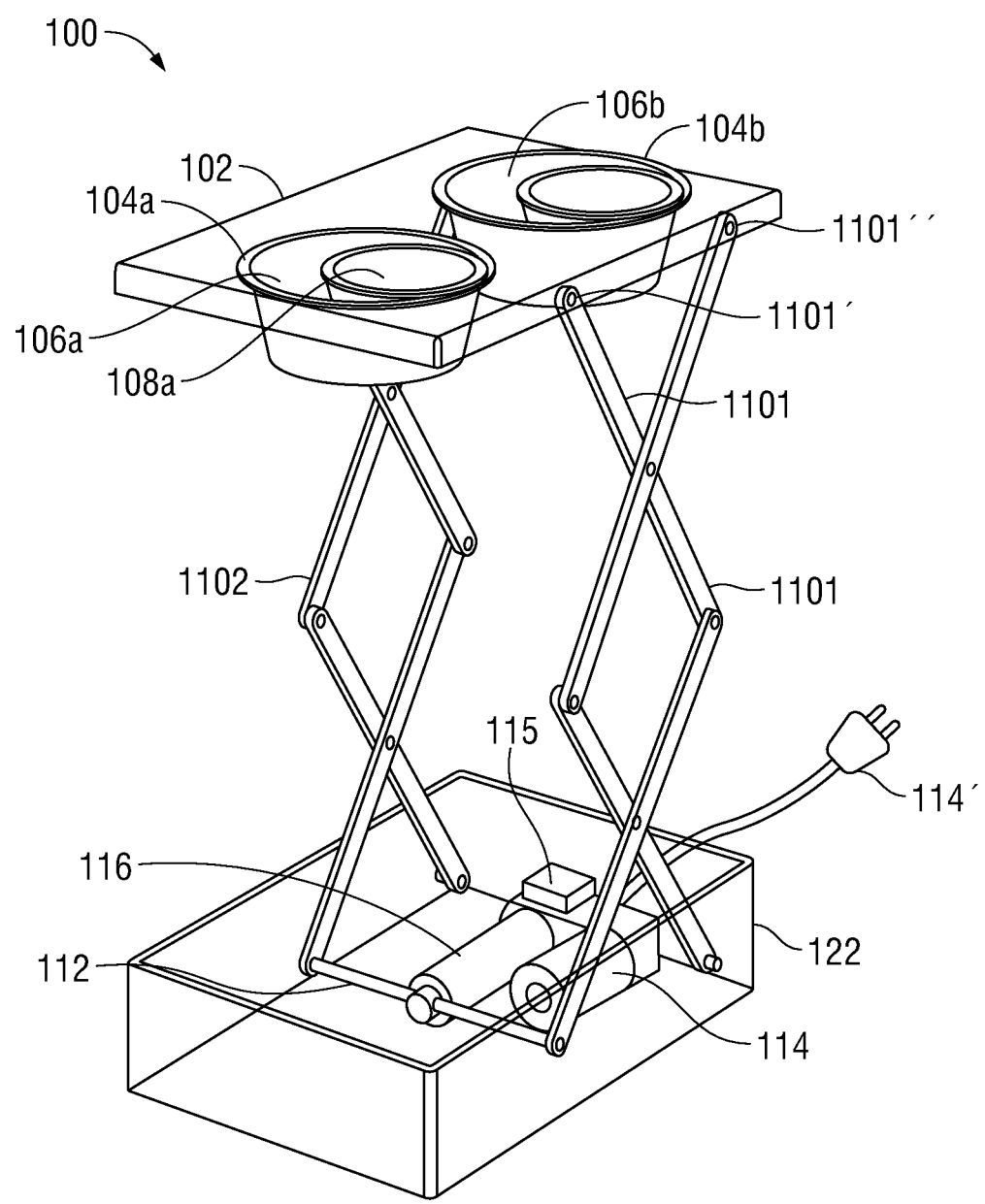
FIG. 4 is a perspective view in an elevated position of an aspect of an adjustable elevation pet food feeder mechanism according to the present disclosure.

FIG. 4 illustrates a pet food device 100 according to an aspect of the present disclosure wherein the actuating mechanism 14 includes a scissor lift movable structure of a first scissor lift 1101 and a second scissor lift 1102 each in operable communication with pet food bowl supporting tray 102 and with an actuating mechanism in the form of a linear actuator 114 having a linear push rod 116 to actuate the scissor lifts 1101 and 1102. The first scissor lift 1101 and the second scissor lift 1102 are interconnected by a scissor connecting rod member 112 which is operably coupled to the linear push rod 116 that in turn exerts a force on the connecting rod member 112 to either cause the scissor lifts 1101 and 1102 to raise or elevate the pet food bowl supporting tray 102 or to lower the pet food bowl supporting tray 102. The scissor lift movable structure 1101, 1102 and the actuating mechanism 114 effect thereby the elevating of and lowering of the pet food bowl supporting tray 102.

A power cord 114' enables connection of the linear actuator 114 actuating mechanism to a standard 110 V or 220 V power source for actuation of the pet food device 100. A radio-frequency (RF) receiver 115 is in electrical communication with the linear actuator 114 to receive control signals CS as described above with respect to FIGS. 1-3 and further described below with respect to FIGS. 47-53. The linear actuator 114, the RF receiver 115, the scissor connecting rod member 112, the scissor lift movable structure first scissor lift 1101 and second scissor lift 1102 and the pet food bowl supporting tray 102 at least partially or entirely reside in the actuating mechanism supporting tray 122 when the pet food device 100 is at least partially or entirely in the lowered position as illustrated in FIGS. 5-13 which follow.

FIG. 5 is a front elevation view of the adjustable elevation pet food feeder mechanism device 100 of FIG. 4 in an elevated position.

FIG. 6 is a side elevation view of the adjustable elevation pet food feeder mechanism 100 of FIG. 5 in an elevated position.

FIG. 7 is another side elevation view of the adjustable elevation pet food feeder mechanism device 100 of FIG. 2 in an elevated position on a side opposite to the side of FIG. 6.

FIG. 8 is a top plan view of the adjustable elevation pet food feeder mechanism device 100 of FIGS. 4-7 when in an elevated position.

Figure 9:
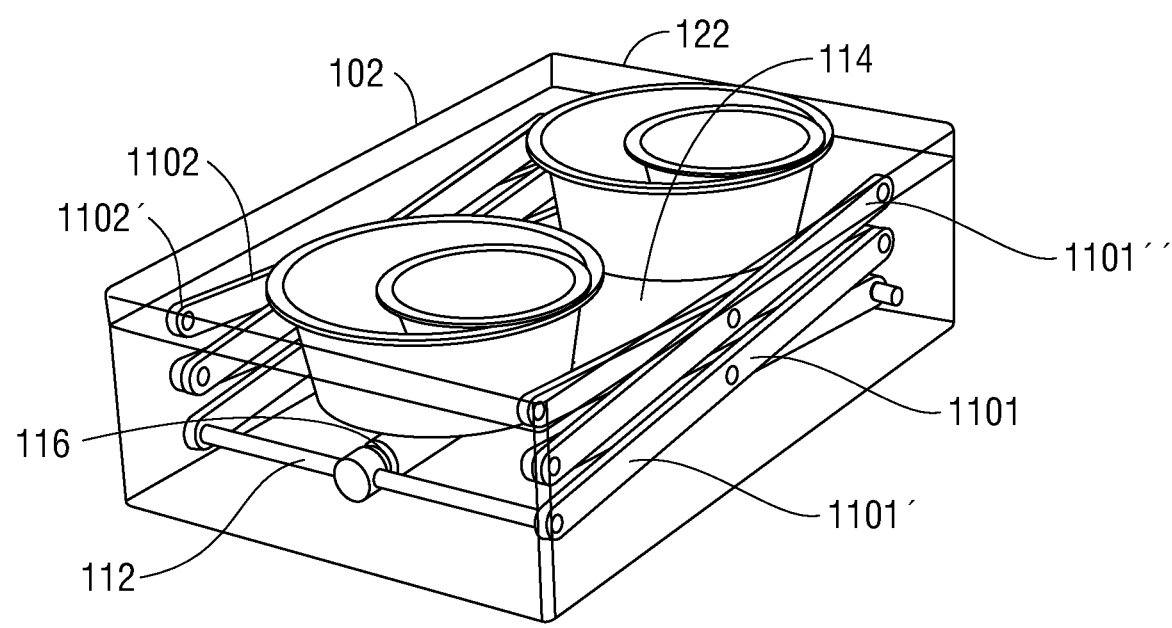
FIG. 9 is a perspective view in a lowered position of the adjustable elevation pet food feeder mechanism of FIG. 4.

FIG. 9 is a perspective view in a lowered position of the adjustable elevation pet food feeder mechanism device 100 of FIG. 4 positioned within the actuating mechanism supporting tray 122.

Figure 10:
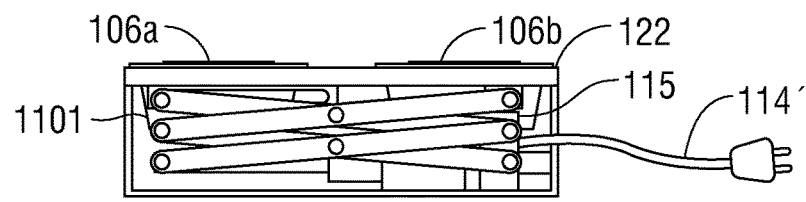
FIG. 10 is a front elevation view in a lowered position of the adjustable elevation pet food feeder mechanism of FIG. 9.

FIG. 10 is a front elevation view in a lowered position of the adjustable elevation pet food feeder mechanism device 100 of FIG. 9 positioned within the actuating mechanism supporting tray 122.

Figure 11:
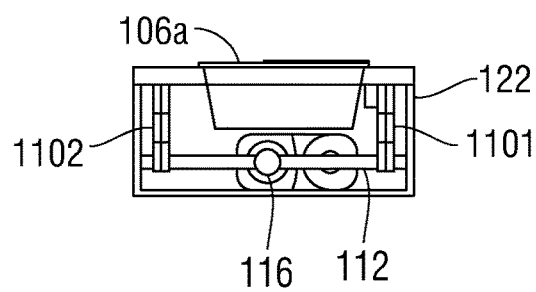
FIG. 11 is a side elevation view in a lowered position of the adjustable elevation pet food feeder mechanism of FIG. 10.

FIG. 11 is a side elevation view in a lowered position of the adjustable elevation pet food feeder mechanism device 100 of FIG. 10 positioned within the actuating mechanism supporting tray 122.

Figure 12:
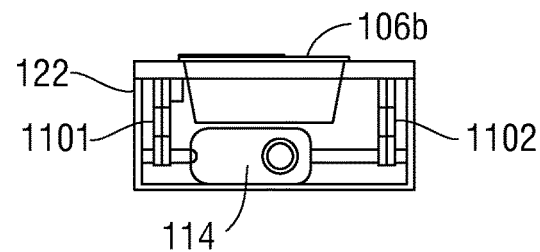
FIG. 12 is another side elevation view in a lowered position of the adjustable elevation pet food feeder mechanism of FIG. 10.

FIG. 12 is another side elevation view in a lowered position of the adjustable elevation pet food feeder mechanism device 100 of FIG. 10 positioned within the actuating mechanism supporting tray 122.

Figure 13:
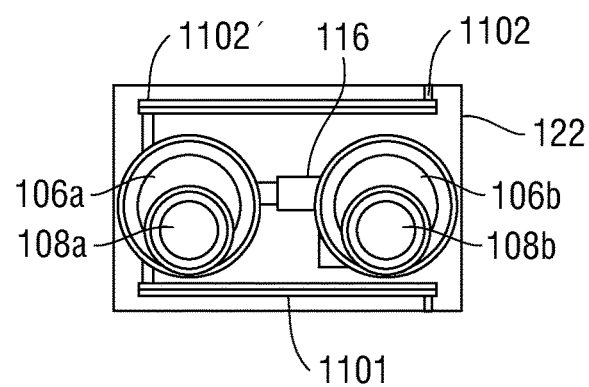
FIG. 13 is a top plan view of the adjustable elevation pet food feeder mechanism of FIGS. 9-12 when in a lowered position.

FIG. 13 is a top plan view of the adjustable elevation pet food feeder mechanism device 100 of FIGS. 9-12 when in a lowered position positioned within the actuating mechanism supporting tray 122.

Figure 14:
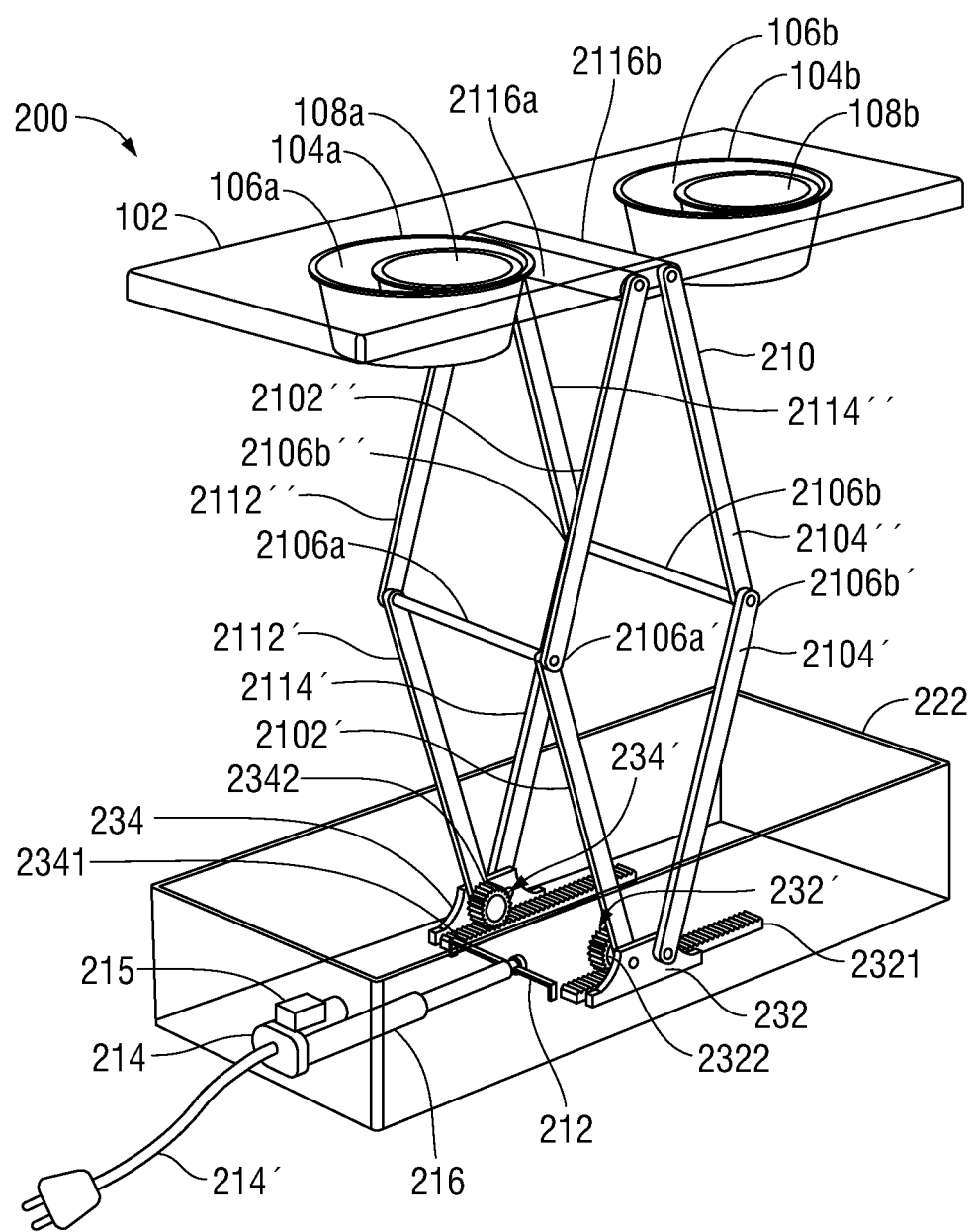
FIG. 14 is a perspective view in an elevated position of an aspect of an adjustable elevation pet food feeder mechanism according to the present disclosure.

FIG. 14 illustrates a pet food device 200 according to an aspect of the present disclosure wherein the actuating mechanism 14 includes a jack lift movable structure 210 of first lower legs 2102', 2104' and second lower legs 2112', 2114' and first upper legs 2102", 2104" and second upper legs 2112", 2114" that are in operable communication with the pet food bowl supporting tray 102 wherein a first cross-beam 2116a joins the first upper leg 2112' and second upper leg 2112" and a second cross-beam 2116b joins the first upper leg 2114' and second upper leg 2114" and both first cross-beam 2116a and second cross-beam 2116b support the pet food bowl supporting tray 102.

The first lower leg 2102' is joined to first upper leg 2102" and second lower leg 2112' is joined to second upper leg 2112" via a first cross-beam member 2106a at their intersection points 2106a' and 2106a", respectively.

Similarly, first lower leg 2104' is joined to first upper leg 2104" and second lower leg 2114' is joined to second upper leg 2114" via a second cross-beam member 2106b at their intersection points 2106b' and 2106b", respectively.

First lower leg 2102' is rotatably coupled to a first brace member 232 while second lower leg 2104' is rotatably coupled to the pinion gear 2322 of a first rack and pinion set 232'.

Similarly, second lower leg 2112' is rotatably coupled to a second brace member 234 while second lower leg 2114' is rotatably coupled to the pinion gear 2342 of a second rack and pinion set 234'.

Pinion gear 2322 of first rack and pinion set 232' is in operable communication with first rack 2321 while pinion gear 2342 of second rack and pinion set 234' is in operable communication with second rack 2341.

First rack 2321 and second rack 2341 are interconnected by a common operating joining member 212 in the form, for example, of a cylindrical rod which in turn is operably coupled to actuating mechanism 14 in the form of linear actuator 214.

Movement of the first rack 2321 and second rack 2341 by the common operating joining member 212 in the direction of dual headed arrow B causes rotation of the pinion gears 2322 and 2342 and thereby effecting elevating of or lowering of the pet food bowl supporting tray 102 by the jack lift movable structure 210.

In a similar manner as with respect to pet food device 100, power cord 214' enables connection of the linear actuator 214 actuating mechanism to a standard 110 V or 220 V power source for actuation of the pet food device 200. A radio-frequency (RF) receiver 215 is in electrical communication with the linear actuator 214 to receive control signals CS as described above with respect to FIGS. 1-3 and further described below with respect to FIGS. 47-53. The linear actuator 214, the RF receiver 215, the common operating joining member 212, the rack and pinion sets 232' and 234', the actuating mechanism 14 in the form of the jack lift movable structure 210 as described above and the pet food bowl supporting tray 102 at least partially or entirely reside in the actuating mechanism supporting tray 222 when the pet food device 200 is at least partially or entirely in the lowered position as illustrated in FIGS. 15-21 which follow.

FIG. 15 is a front elevation view of the adjustable elevation pet food feeder mechanism device 200 of FIG. 13 in an elevated position.

FIG. 16 is a side elevation view of the adjustable elevation pet food feeder mechanism device 200 of FIG. 13 in an elevated position.

FIG. 17 is a top plan view of the adjustable elevation pet food feeder mechanism device 200 of FIGS. 14-16 when in an elevated position.

Figure 18:
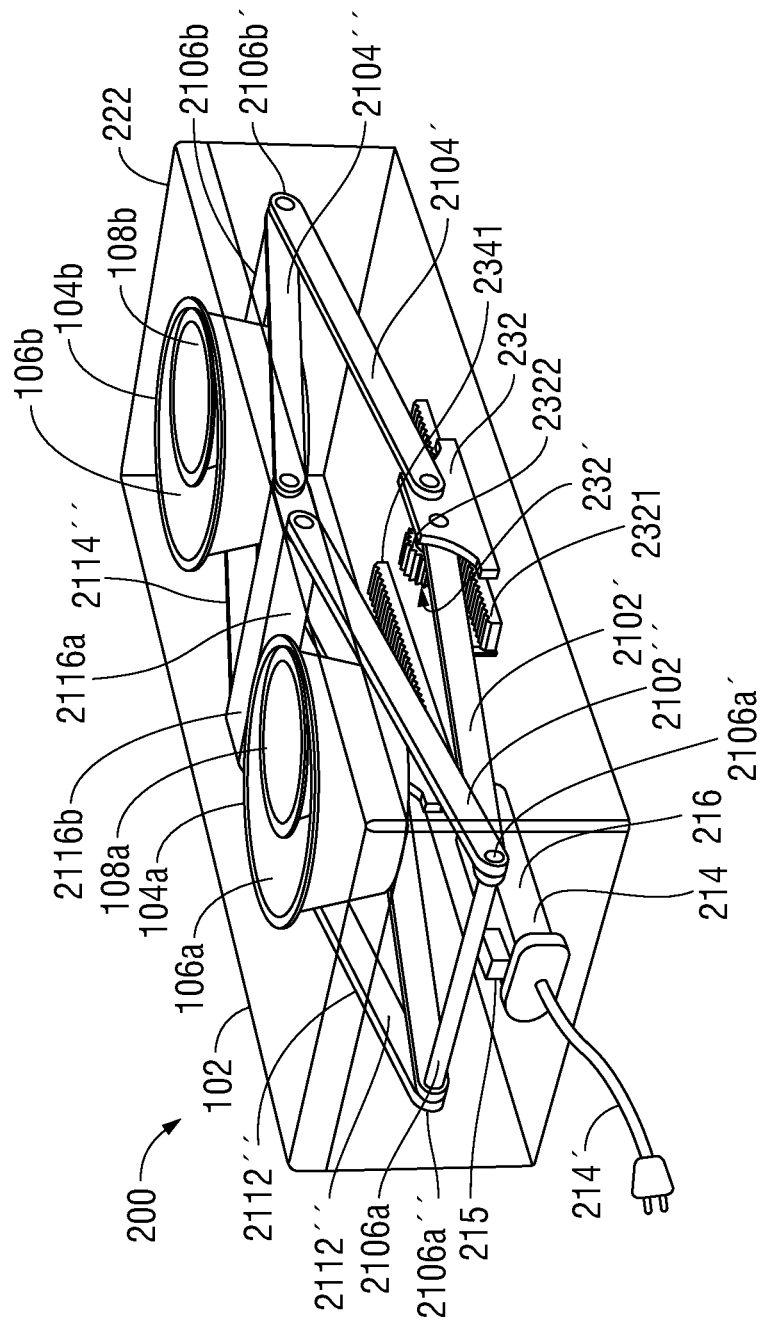
FIG. 18 is a perspective view in a lowered position of the adjustable elevation pet food feeder mechanism of FIG. 14.

FIG. 18 is a perspective view of the adjustable elevation pet food feeder mechanism device 200 of FIG. 14 in a lowered position positioned within the actuating mechanism supporting tray 222.

Figure 19:
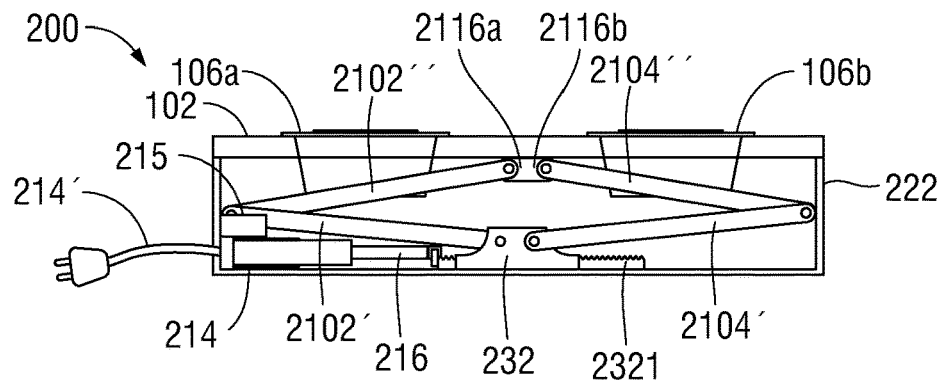
FIG. 19 is a front elevation view in a lowered position of the adjustable elevation pet food feeder mechanism of FIG. 18.

FIG. 19 is a front elevation view of the adjustable elevation pet food feeder mechanism device 200 of FIG. 18 in a lowered position positioned within the actuating mechanism supporting tray 222.

Figure 20:
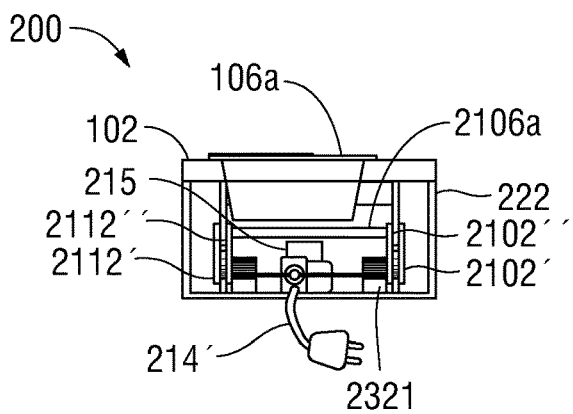
FIG. 20 is a side elevation view in a lowered position of the adjustable elevation pet food feeder mechanism of FIG. 19.

FIG. 20 is a side elevation view in a lowered position of the adjustable elevation pet food feeder mechanism device 200 of FIG. 19.

Figure 21:
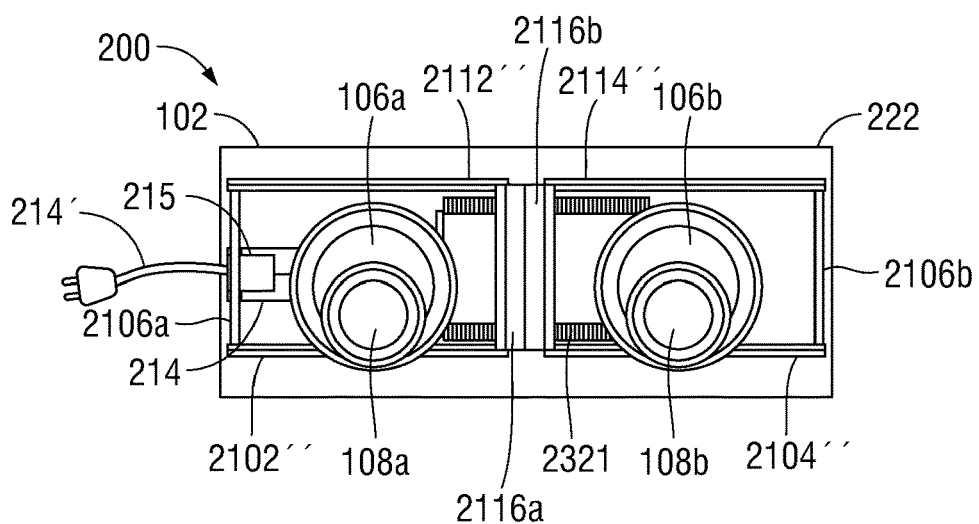
FIG. 21 is a top plan view of the adjustable elevation pet food feeder mechanism of FIGS. 18-20 when in a lowered position.

FIG. 21 is a top plan view of the adjustable elevation pet food feeder mechanism device 200 of FIGS. 18-20 when in a lowered position positioned within the actuating mechanism supporting tray 222.

Figure 22:
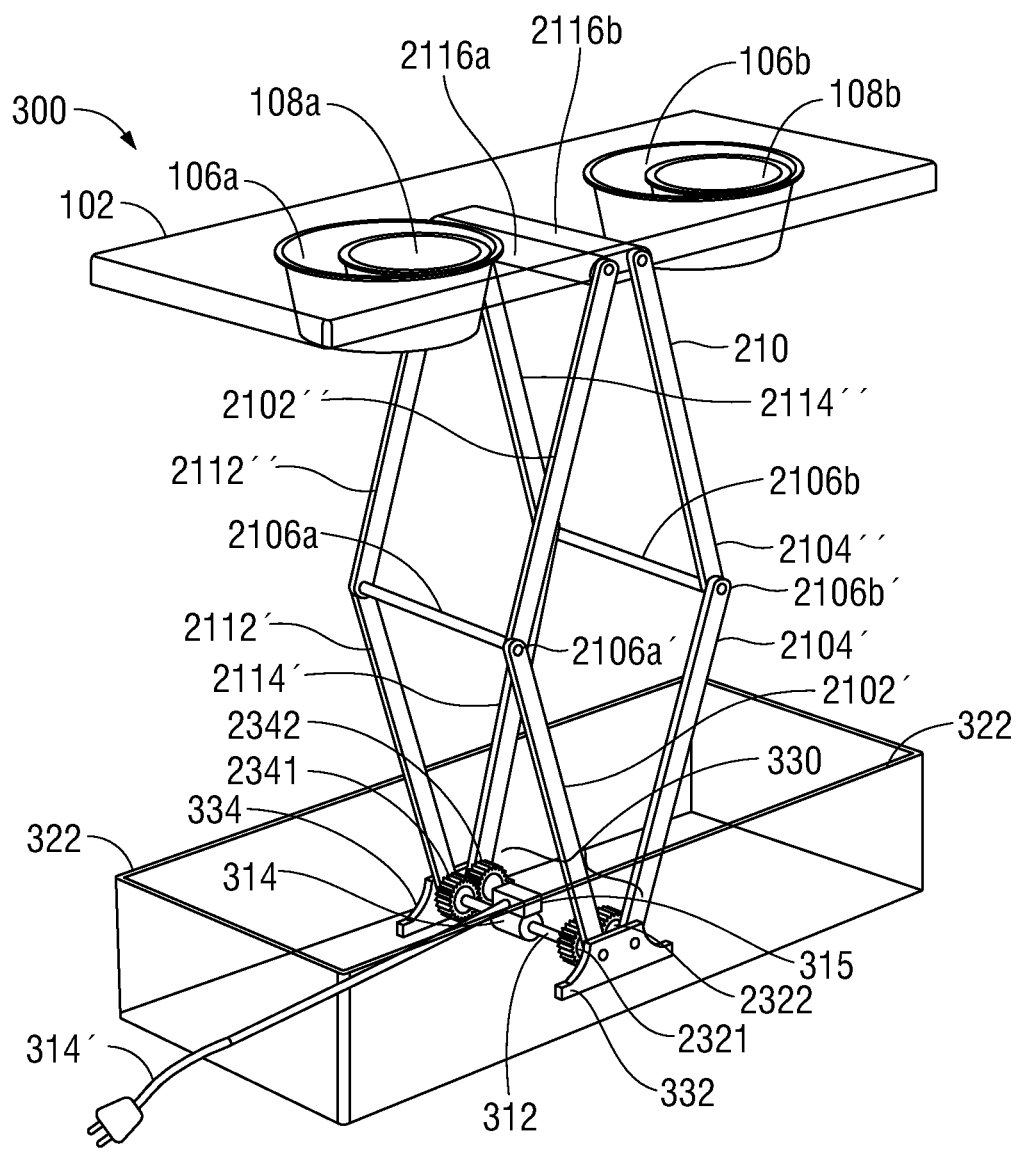
FIG. 22 is a perspective view in an elevated position of an aspect of an adjustable elevation pet food feeder mechanism according to the present disclosure.

FIG. 22 illustrates an adjustable elevation pet food feeder mechanism device 300 according to an aspect of the present disclosure. Pet food feeder mechanism device 300 is substantially identical to pet food feeder mechanism device 200 by including the pet food bowl supporting tray 102 wherein the actuating mechanism 14 of the pet food bowl supporting tray 102 includes the jack lift movable structure 210, as described above with respect to pet food feeder mechanism device 200 and FIGS. 14-21, but modified such that the actuating mechanism 14 includes motorized gears in operable communication with the jack lift movable structure 210 wherein the jack lift movable structure 210 and the motorized gears thereby effect the elevating of and lowering of the pet food bowl supporting tray 102.

More particularly, the rack and pinion sets 232' and 234' and the linear actuator 214 are now replaced by motorized gear set 330 which includes a motor 314 operably coupled to a dual rotatable operating shaft 312.

First lower leg 2102' is rotatably coupled to first brace member 332 via a first gear 3321 while second lower leg 2104' is rotatably coupled to first brace member 332 via a second gear 3322.

Similarly, second lower leg 2112' is rotatably coupled to second brace member 334 via a first gear 3341 while second lower leg 2114' is rotatably coupled to second brace member 334 via a second gear 3342.

The dual rotatable operating shaft 312 is now operably coupled either to first gear 3321 and first gear 3341 (not shown) or to second gear 3322 and second gear 3342 such that now rotation of the operating shaft 312 either clockwise or counterclockwise causes the jack lift movable structure 210 to thereby effect the elevating of and lowering of the pet food bowl supporting tray 102.

As before, power cord 314' enables connection of the motor 314 actuating mechanism to a standard 110 V or 220 V power source for actuation of the pet food device 300. A radio-frequency (RF) receiver 315 is in electrical communication with the motor 314 to receive control signals CS as described above with respect to FIGS. 1-3 and further described below with respect to FIGS. 47-53. The motor 314, the RF receiver 315, the operating shaft 312, the gear set 330, the actuating mechanism 14 in the form of the jack lift movable structure 210 as described above and the pet food bowl supporting tray 102 at least partially or entirely reside in the actuating mechanism supporting tray 322 when the pet food device 300 is at least partially or entirely in the lowered position as illustrated in FIGS. 23-29 which follow.

Figure 23:
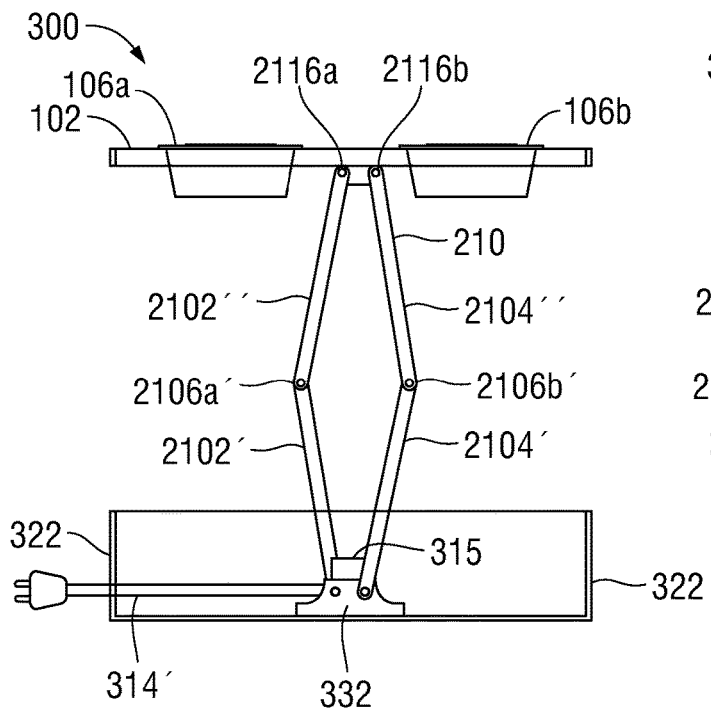
FIG. 23 is a front elevation view of the adjustable elevation pet food feeder mechanism of FIG. 22 in an elevated position.

FIG. 23 is a front elevation view of the adjustable elevation pet food feeder mechanism device 300 of FIG. 22 in an elevated position.

Figure 24:
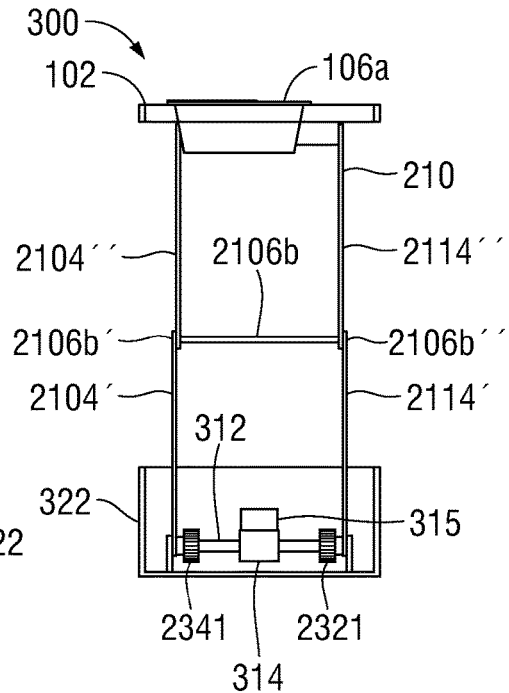
FIG. 24 is a side elevation view of the adjustable elevation pet food feeder mechanism of FIG. 23 in an elevated position.

FIG. 24 is a side elevation view of the adjustable elevation pet food feeder mechanism device 300 of FIG. 23 in an elevated position.

Figure 25:
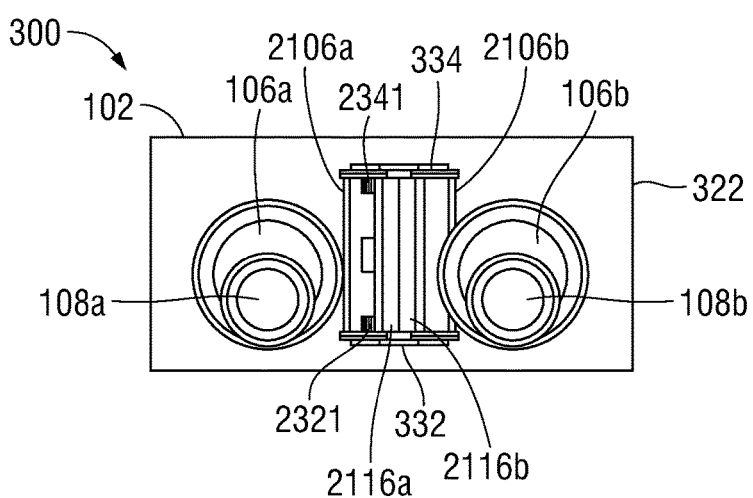
FIG. 25 is a top plan view of the adjustable elevation pet food feeder mechanism of FIGS. 22-24 when in an elevated position.

FIG. 25 is a top plan view of the adjustable elevation pet food feeder mechanism device 300 of FIGS. 22-24 when in an elevated position.

Figure 26:
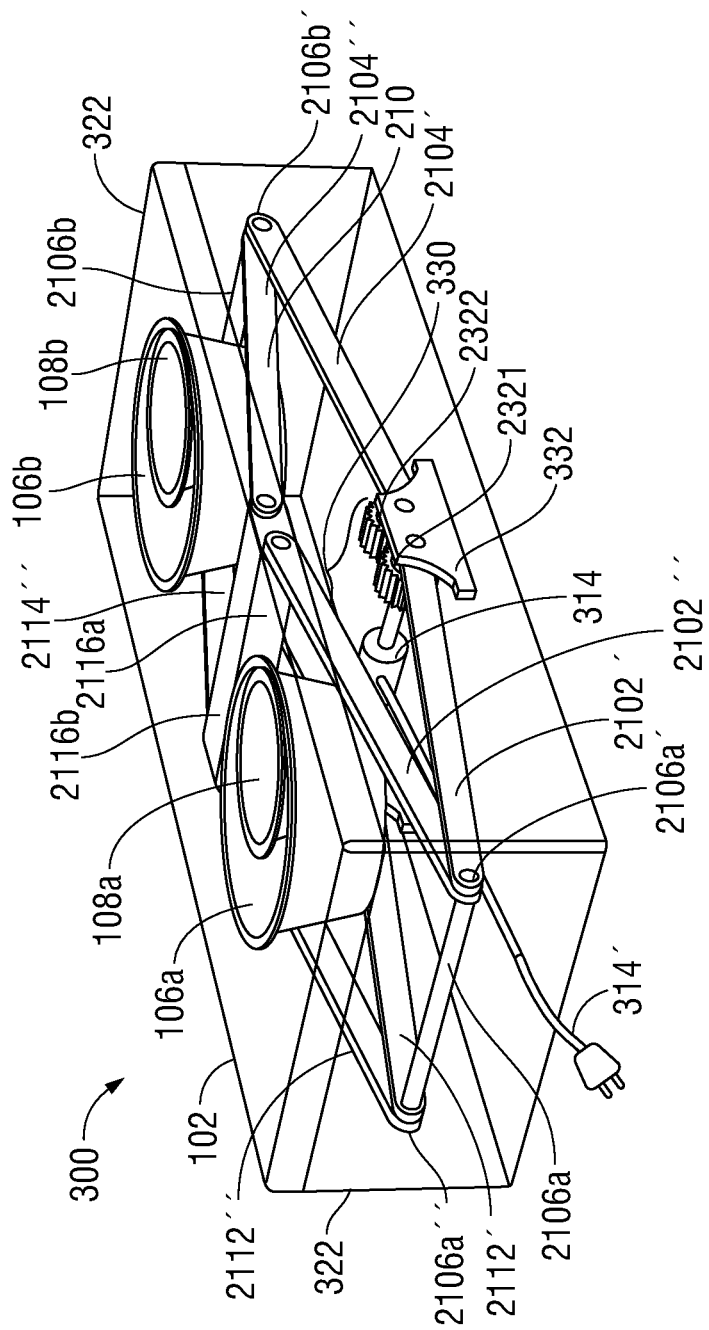
FIG. 26 is a perspective view in a lowered position of the adjustable elevation pet food feeder mechanism of FIG. 22.

FIG. 26 is a perspective view of the adjustable elevation pet food feeder mechanism device 300 of FIG. 22 in a lowered position positioned within the actuating mechanism supporting tray 322.

Figure 27:
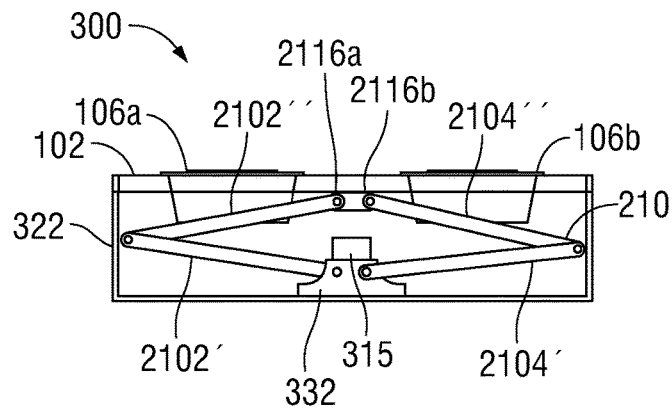
FIG. 27 is a front elevation view in a lowered position of the adjustable elevation pet food feeder mechanism of FIG. 26.

FIG. 27 is a front elevation view of the adjustable elevation pet food feeder mechanism device 300 of FIG. 26 in a lowered position positioned within the actuating mechanism supporting tray 322.

Figure 28:
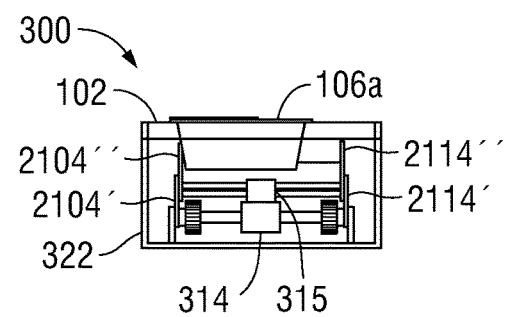
FIG. 28 is a side elevation view in a lowered position of the adjustable elevation pet food feeder mechanism of FIG. 27.

FIG. 28 is a side elevation view of the adjustable elevation pet food feeder mechanism device 300 of FIG. 27 in a lowered position positioned within the actuating mechanism supporting tray 322.

Figure 29:
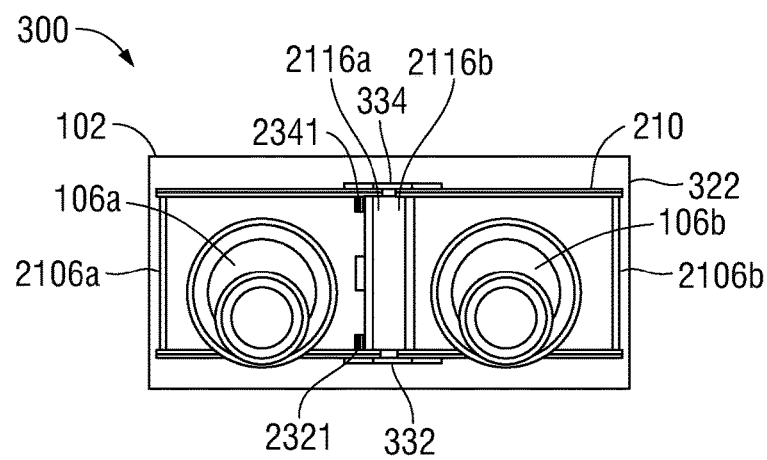
FIG. 29 is a top plan view of the adjustable elevation pet food feeder mechanism of FIGS. 26-28 when in a lowered position.

FIG. 29 is a top plan view of the adjustable elevation pet food feeder mechanism device 300 of FIGS. 26-28 when in a lowered position positioned within the actuating mechanism supporting tray 322.

Figure 30:
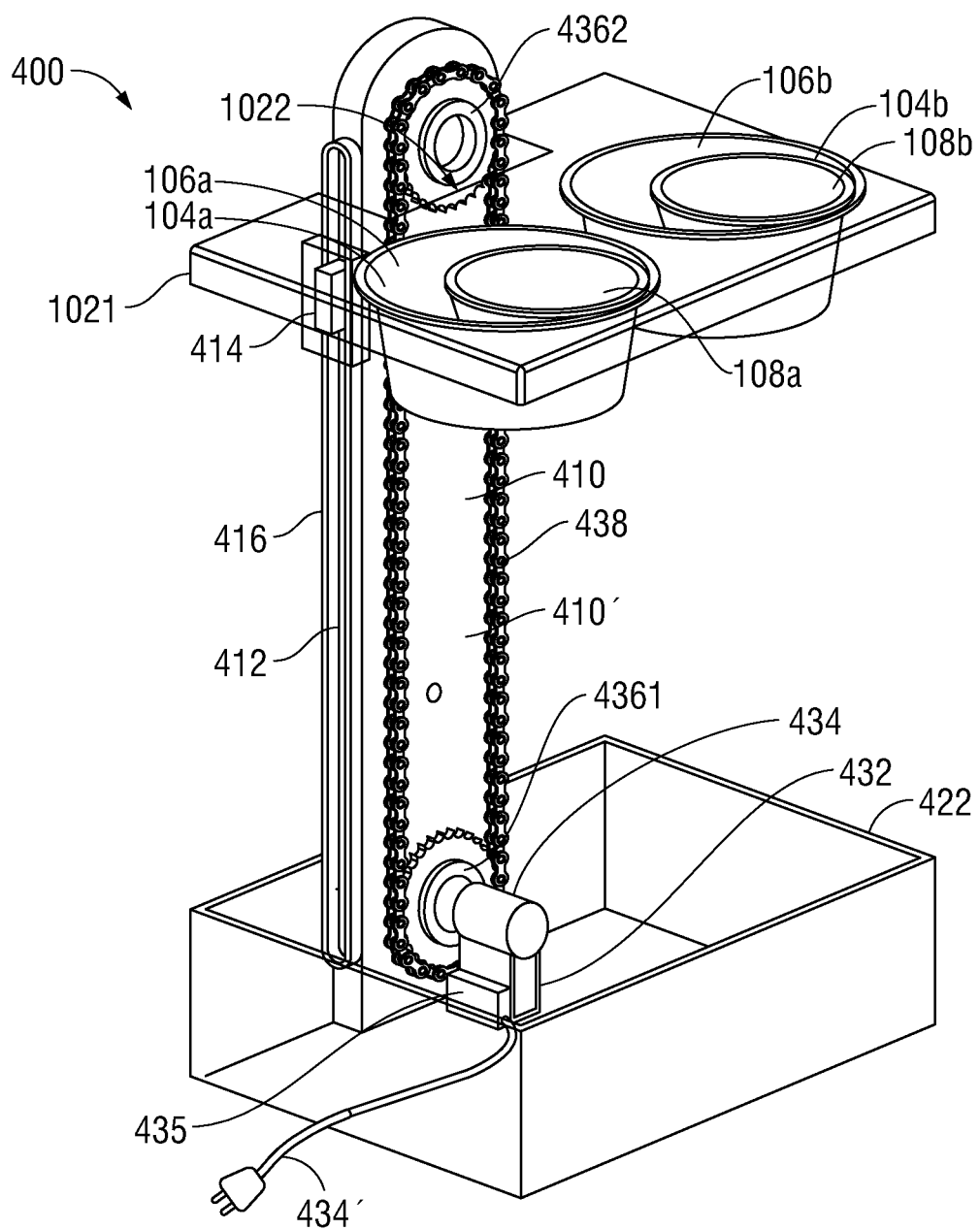
FIG. 30 is a perspective view in an elevated position of an aspect of an adjustable elevation pet food feeder mechanism according to the present disclosure.

FIG. 30 illustrates in an elevated position an adjustable elevation pet food feeder mechanism device 400 according to an aspect of the present disclosure.

Figure 31:
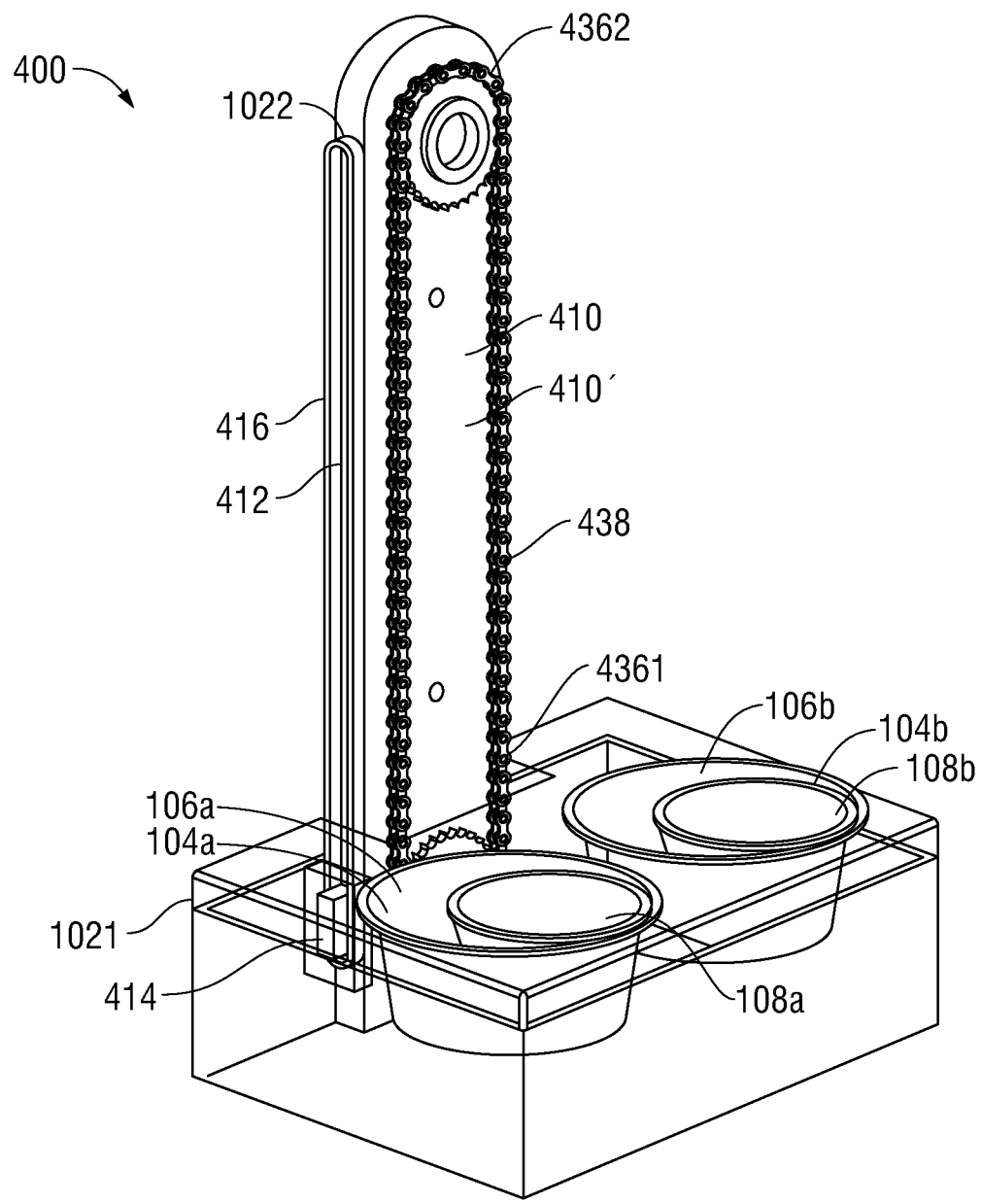
FIG. 31 is a perspective view in a lowered position of the adjustable elevation pet food feeder mechanism of FIG. 30.

FIG. 31 is a perspective view in a lowered position of the adjustable elevation pet food feeder mechanism of FIG. 30 in a lowered position positioned within actuating mechanism supporting tray 422.

More particularly, referring to FIGS. 30-31, pet food device 400 includes as pet food bowl supporting tray 12 pet food bowl supporting tray 1021 which is substantially identical to pet food bowl supporting tray 102 except for a rectangular space 1022 formed on one edge of the supporting tray 1021 that enables receiving of a riser panel 410 therein.

Actuating mechanism 14 now includes riser panel 410 that is supported by actuating mechanism supporting tray 18 as represented by actuating mechanism supporting tray 422. A channel 412 is defined by a guide structure 416 mounted on or formed by vertical projecting edge 416 of the riser panel 410. A support connector member 414 is slidably disposed in the channel 412 and is operably coupled to the supporting tray 1021 within the rectangular space 1022.

The support connector member 414 is also operably coupled to a chain link and gear set 436 that is configured to enable the support connector member 414 to slide in the channel 412 effecting thereby the elevating of and lowering of the pet food bowl supporting tray 1021.

Actuating mechanism 14 also includes motor 434 on a mounting stand 432 that is fixedly positioned within actuating mechanism supporting tray 422. Motor 434 is operably coupled to a first gear 4361 at the lower end portion of the riser panel 410 that engages with a chain 438 that is mounted across the vertical flat surface 410' of the riser panel 410. Chain 438 also engages with a second gear 4362 at the upper end portion of the riser panel 410 thereby enabling the chain 438 and the support connector member 414 to move either vertically up or vertically down to enable the sliding in the channel 412 that effects the elevating of and lowering of the pet food bowl supporting tray 1021.

The motor 434 is capable of either clockwise or counterclockwise rotation and, as before, is powered via power supplied by power cord 434' that enables connection of the motor 434 actuating mechanism to a standard 110 V or 220 V power source for actuation of the pet food device 400. A radio-frequency (RF) receiver 435 is in electrical communication with the motor 434 to receive control signals CS as described above with respect to FIGS. 1-3 and further described below with respect to FIGS. 47-53. The motor 434, the RF receiver 435, the first gear 4361 and the lower end portion of the chain 438 and the pet food bowl supporting tray 1021 at least partially or entirely reside in the actuating mechanism supporting tray 422 when the pet food device 400 is at least partially or entirely in the lowered position as illustrated in FIG. 31.

Figure 32:
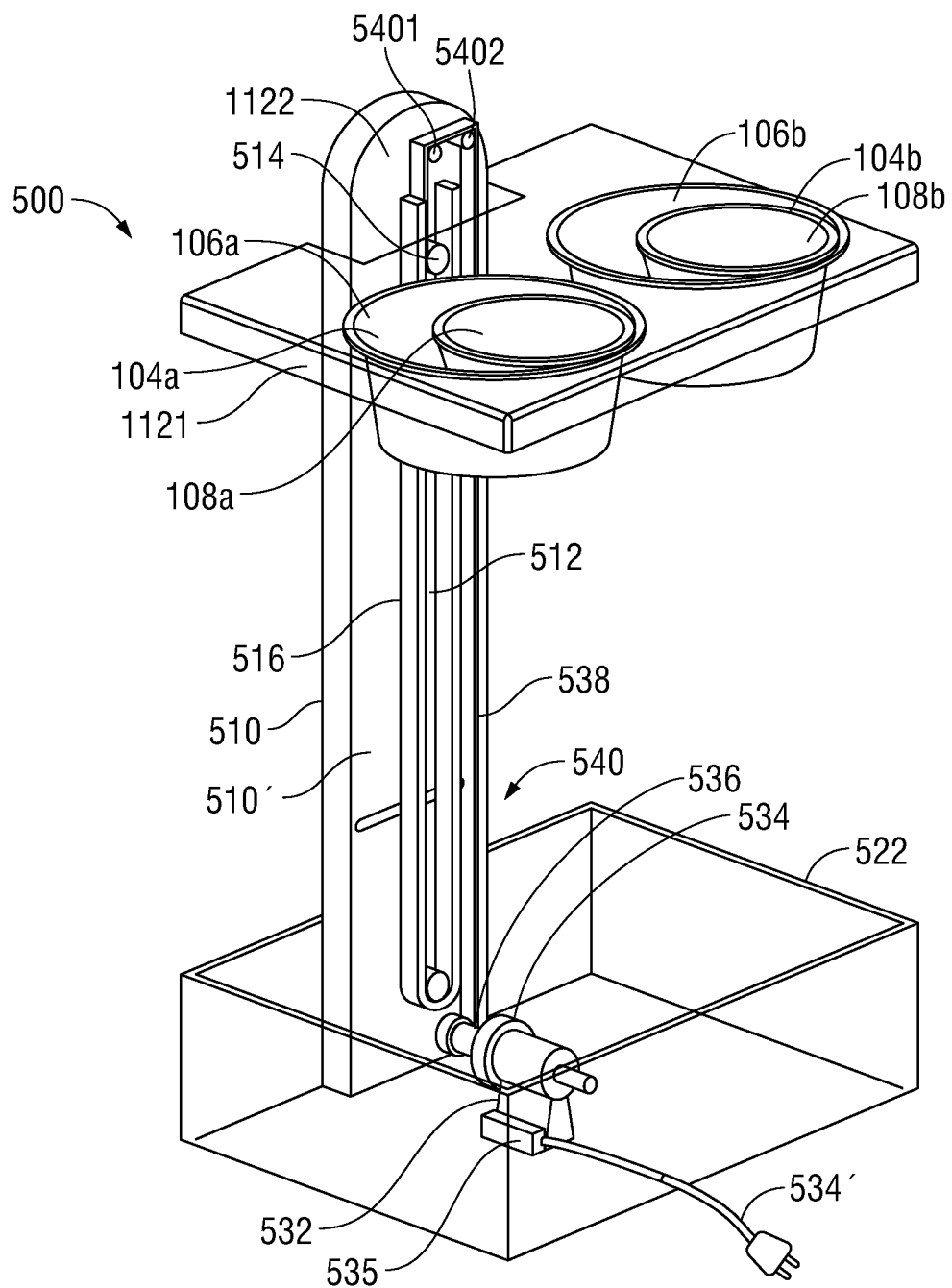
FIG. 32 is a perspective view in an elevated position of an aspect of an adjustable elevation pet food feeder mechanism according to the present disclosure.

FIG. 32 is a perspective view in an elevated position of an aspect of an adjustable elevation pet food feeder mechanism 500 according to the present disclosure.

Figure 33:
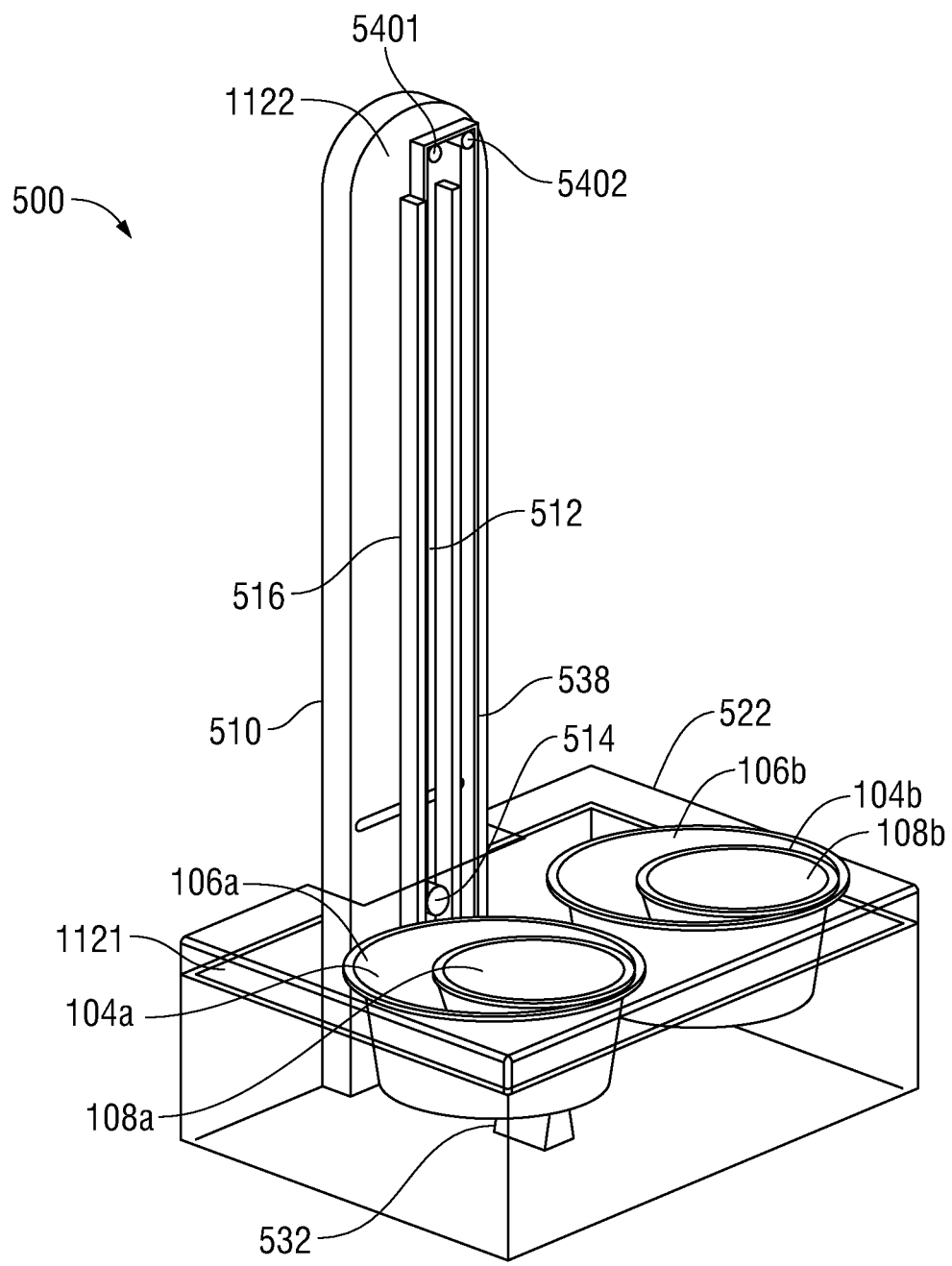
FIG. 33 is a perspective view in a lowered position of the adjustable elevation pet food feeder mechanism of FIG. 32.

FIG. 33 is a perspective view of the adjustable elevation pet food feeder mechanism 500 of FIG. 32 in a lowered position positioned within actuating mechanism supporting tray 522.

More particularly, referring to FIGS. 32-33, pet food device 500 includes as pet food bowl supporting tray 12 pet food bowl supporting tray 1121 which also is substantially identical to pet food bowl supporting tray 102 except for rectangular space 1122 formed on one edge of the supporting tray 1121 that enables receiving of riser panel 510 therein.

Actuating mechanism 14 now includes riser panel 510 that is supported by actuating mechanism supporting tray 18 as represented by actuating mechanism supporting tray 522. A channel 512 is defined by vertical projection 516 that projects from front surface 510' of the riser panel 510. A support connector member 514 is slidably disposed in the channel 512 and is operably coupled to the supporting tray 1121 within the rectangular space 1122.

The support connector member 514 is formed or connected at one end of a belt 538 included in a belt and pulley mechanism 540 wherein belt pulley wheel 536 is operably coupled to motor 534 such that the motor 534 and belt and pulley mechanism 540 are configured to enable the support connector member 514 to slide in the channel 512 effecting thereby the elevating of and lowering of the pet food bowl supporting tray 1021.

Actuating mechanism 14 also includes motor 534 on a mounting stand 532 that is fixedly positioned within actuating mechanism supporting tray 522. Belt and pulley mechanism 540 also includes belt rotatable shafts 5401 and 5402 that are mounted at the upper end portion of the riser panel 510. First rotatable shaft 5401 is mounted in a position to enable the belt 538 to align with and pass through the open end of the channel 512 thereby enabling the support connector member 514 to be elevated or lowered within the channel 512 as a result of motion of the belt 538. A second rotatable shaft 5401 is mounted to enable the belt 538 to move and be positioned substantially parallel to the parallel walls of the vertical projection 516.that is mounted along the vertical flat surface 510' of the riser panel 510.

Thereby, clockwise or counterclockwise rotation of the motor 535 thereby enables the support connector member 514 to move either vertically up or vertically down to enable the sliding in the channel 512 that effects the elevating of and lowering of the pet food bowl supporting tray 1121.

As noted, motor 534 is capable of either clockwise or counterclockwise rotation and, as before, is powered via power supplied by power cord 534' that enables connection of the motor 534 actuating mechanism to a standard 110 V or 220 V power source for actuation of the pet food device 500. A radio-frequency (RF) receiver 535 is in electrical communication with the motor 534 to receive control signals CS as described above with respect to FIGS. 1-3 and further described below with respect to FIGS. 47-53. The motor 534, the RF receiver 535, the lower end portion of the riser panel 510 and the belt pulley wheel 536 and the pet food bowl supporting tray 1121 at least partially or entirely reside in the actuating mechanism supporting tray 522 when the pet food device 500 is at least partially or entirely in the lowered position as illustrated in FIG. 33.

Figure 34:
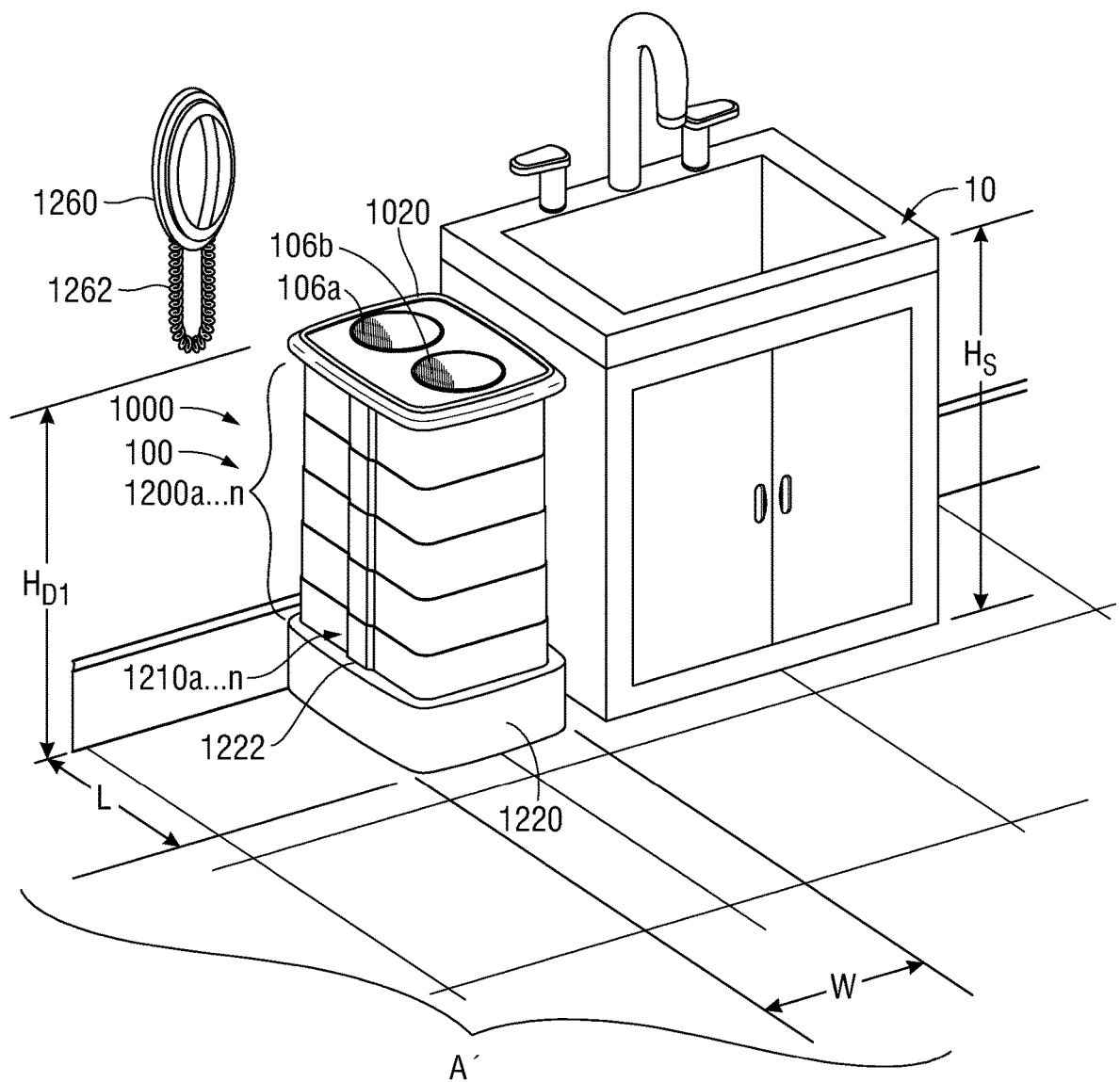
FIG. 34 is a perspective view in an elevated position of another aspect of the adjustable elevation pet food feeder mechanism of FIGS. 4-14 according to the present disclosure.

FIG. 34 is a perspective view in an elevated position of another aspect of the adjustable elevation pet food feeder mechanism 100 of FIGS. 4-14 designated as pet food feeder mechanism device 1000 according to the present disclosure. In the elevated position and positioned next to a sink 10, pet food feeder mechanism device 1000 may be configured such that the pet food bowl supporting tray 1020 is within a comfortable position for a user to place bowls 106a and 106b in the sink 10 for washing, etc., such as height $H_{D1}$ of the device 1000 in the elevated position as compared to height $H_S$ of the sink 10.

Figure 35:
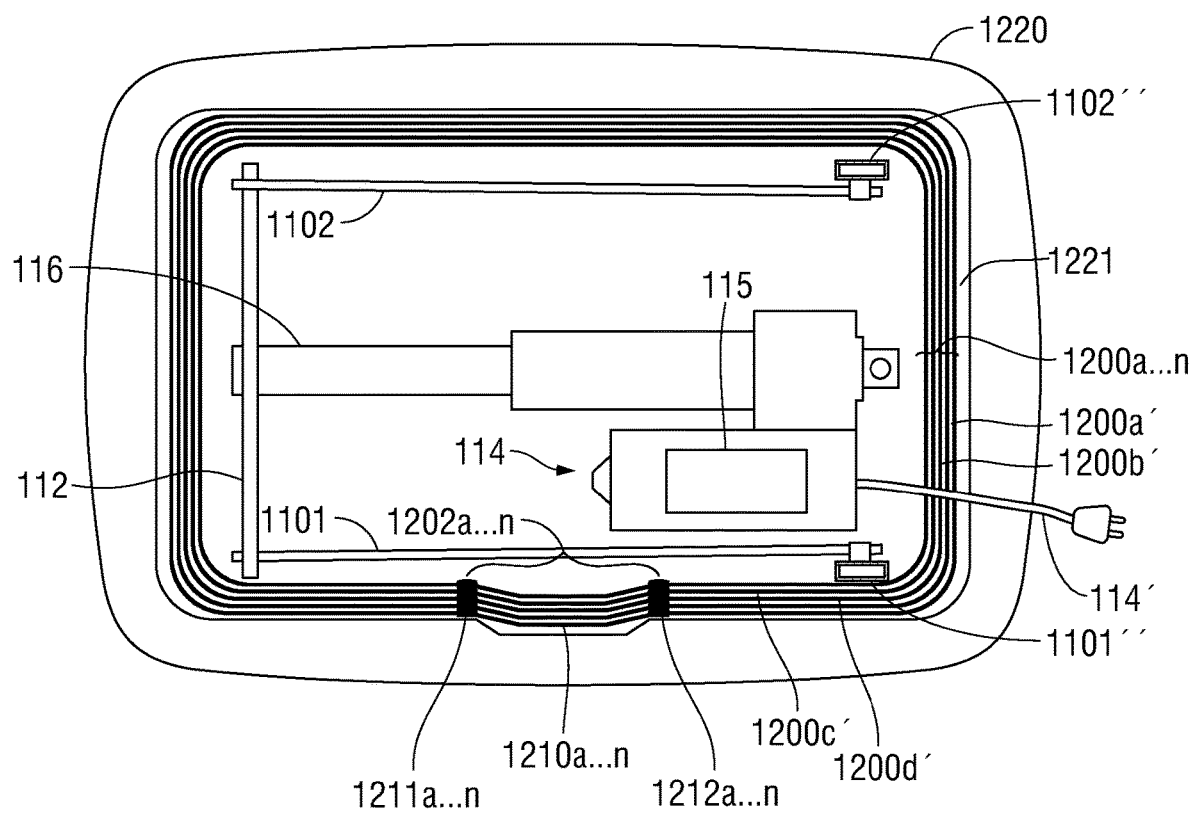
FIG. 35 is a plan view of the support tray containing the actuating components for the adjustable elevation pet food feeder mechanism of FIG. 34.
Figure 36:
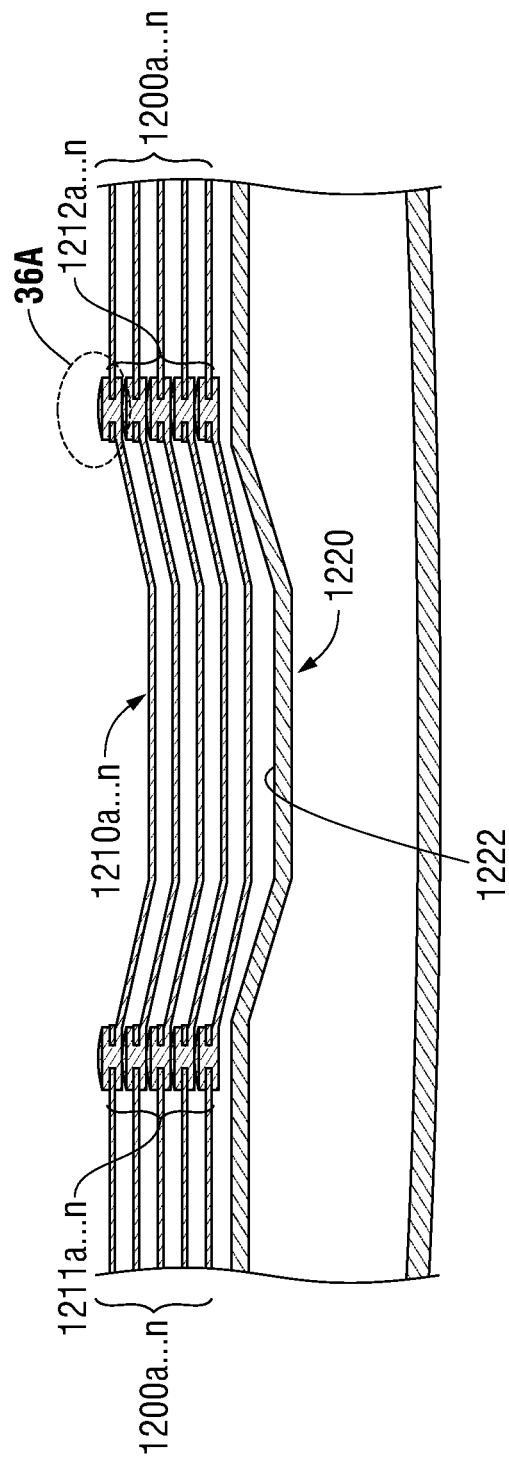
FIG. 36 is a detailed plan view of telescoping shields that enclose the actuating components of the adjustable elevation pet food feeder mechanism of FIGS. 34-35.

FIG. 35 is a plan view of the support tray 1220 containing the actuating components for the adjustable elevation pet food feeder mechanism 1000 of FIG. 34;

FIG. 36 is a detailed plan view of telescoping shields 1200a . . . 1200n that may enclose the actuating components of the adjustable elevation pet food feeder mechanism 1000 of FIGS. 34-35.

Figure 36A:
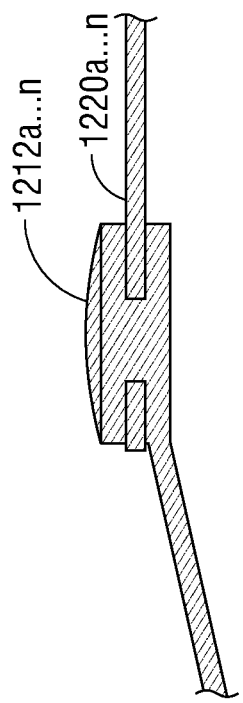
FIG. 36A is a detailed view of a portion of the telescoping shields of FIG. 36.

FIG. 36A is a detailed view of a portion of the telescoping shields 1200a . . . 1200n of FIG. 36.

More particularly, referring to FIGS. 34-36A, actuating mechanism supporting tray 1220 defines an inner periphery 1221. A plurality of telescoping shields 1200a . . . 1200n configured as sequentially interlocking panels extend around the inner periphery 1221 of the actuating mechanism supporting tray 1220. The first of the plurality of telescoping shields 1200a is configured to interface with the inner periphery 1221 and defines an inner surface 1200a'. The second of the plurality of telescoping shields 1200b extends around the inner surface 1200a' of the first of the plurality of telescoping shields 1200a and each subsequent telescoping shield 1200c, 1200d, 1200e, wherein five shields are shown by way of example and not as a limitation, fewer or greater number of shields may be provided depending upon the particular design requirements or optional features, extends around the inner surface 1200b', 1200c', 1200d' of the prior telescoping shield 1200b, 1200c, 1200d. The final telescoping shield 1200e extends to contact the pet food bowl supporting tray 1020.

As best shown in FIGS. 35-36, the plurality of telescoping shields 1200a . . . 1200e each define a gap 1202a . . . 1202e in extending around the inner surface 1200a', 1200b', 1200c', 1200d' of the prior telescoping shield 1200a, 1200b, 1200c, 1200d. A plurality of connectors 1210a . . . 1210e, corresponding to the plurality of telescoping shields 1200a . . . 1200e are each configured to span the gap 1202a . . . 1202e in extending around the inner surface 1200a', 1200b', 1200c', 1200d' of the prior telescoping shield 1200a, 1200b, 1200c, 1200d.

The connectors 1210a . . . 1210e, are configured as linear guides that guide the telescoping shields 1200a, 1200b, 1200c, 1200d, 1200e to extend from a lowered position of the pet food device 1000 to an elevated position of the pet food device 1000.

The connectors 1210a . . . 1210e have an arched configuration to enable flexing both of the connectors themselves and also of the telescoping shields 1200a, 1200b, 1200c, 1200d, 1200e so that the gaps 1202a . . . 102e can be adjusted to enable the connectors 1210a . . . 1210e to connect to the telescoping shields 1200a, 1200b, 1200c, 1200d, 1200e. An arched portion 1222 of the actuating mechanism supporting tray 1220 is configured to receive within and accommodate the arched configuration of the connectors 1210a . . . 1210e.

The connectors 1210a . . . 1210e are best illustrated in FIGS. 36 and 36A in which side edges of the connectors 1210a . . . 1210e are integrally formed with as shown, or include separate, linear guides 1211a . . . 1211e on a first end of the connectors 1210a . . . 1210e and linear guides 1212a . . . 1212e. The linear guides 1211a . . . 1211e and 1212a . . . 1212e are configured to receive and retain the open edges of telescoping shields 1200a, 1200b, 1200c, 1200d, 1200e so as to span the gaps formed between the open edges of the telescoping shields.

FIG. 34 illustrates for comparison purposes of scale and size a wall-mounted telephone 1260 having a cord 1262 wherein the pet food device 1000 is positioned beneath the telephone 1260 and cord 1262 and adjacent to the sink 10. As best shown in FIG. 34 and FIGS. 37-42 which follow, the linear guides 1211a . . . 1211e and 1212a . . . 1212e enable the actuating mechanism 14 to telescope vertically upward or to collapse vertically downward the telescoping shields 1200a, 1200b, 1200c, 1200d, 1200e.

FIG. 37 is a front elevation cross-sectional view in an elevated position of the adjustable elevation pet food feeder mechanism of FIGS. 34-36 illustrating the first scissor lift 1101 in an extended position to elevate the pet food bowl supporting tray 1020.

FIG. 38 is a front elevation cross-sectional view in a lowered position of the adjustable elevation pet food feeder mechanism 1000 of FIGS. 34-37 illustrating the first scissor lift 1101 in a collapsed position to lower the pet food bowl supporting tray 1020.

Figure 39:
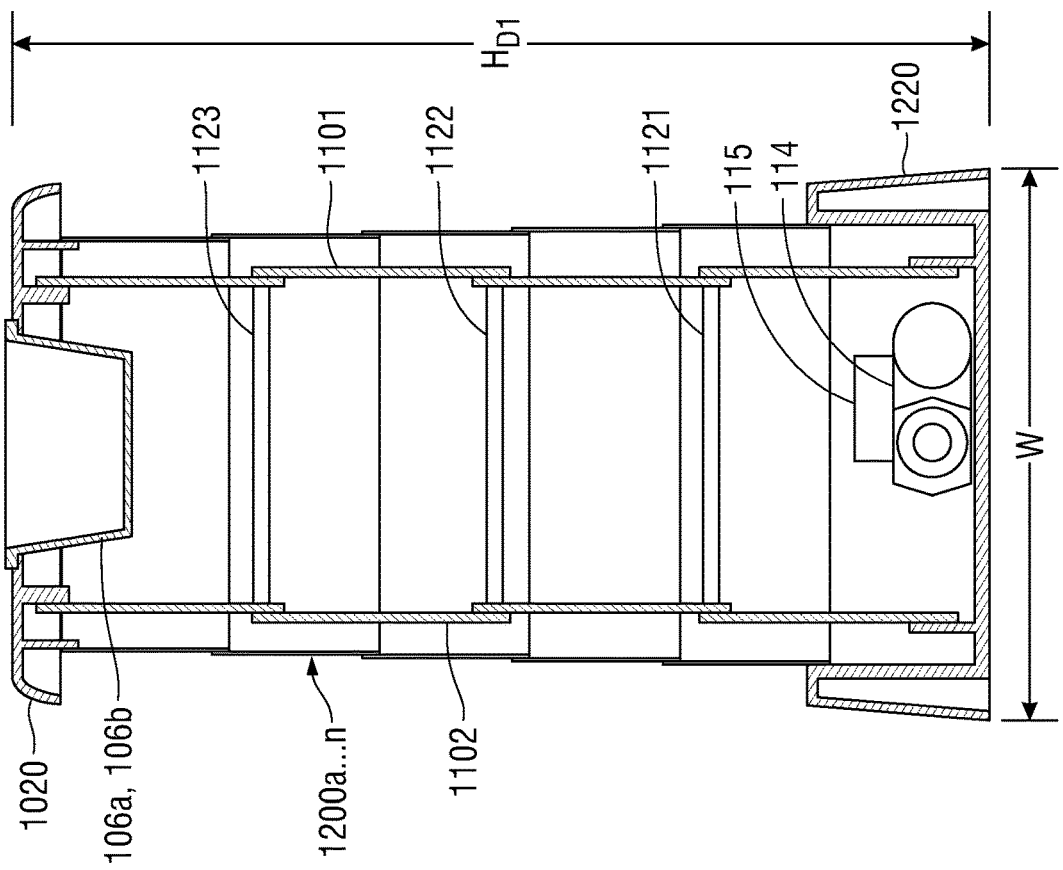
FIG. 39 is a side elevation cross-sectional view in an elevated position of the adjustable elevation pet food feeder mechanism of FIGS. 34-38.

FIG. 39 is a side elevation cross-sectional view in an elevated position of the adjustable elevation pet food feeder mechanism 1000 of FIGS. 34-38 illustrating both the first scissor lift 1101 and the second scissor lift 1102 in extended positions to elevate the the pet food bowl supporting tray 1020.

Figure 40:
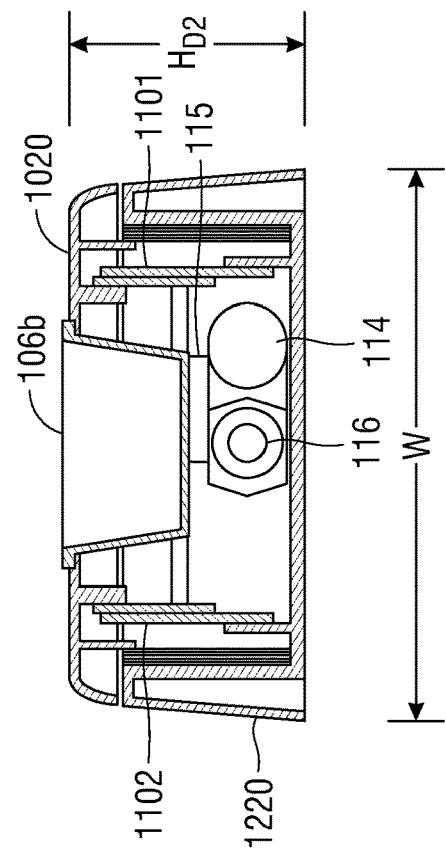
FIG. 40 is a side elevation cross-sectional view in a lowered position of the adjustable elevation pet food feeder mechanism of FIGS. 34-37.

FIG. 40 is a side elevation cross-sectional view in a lowered position of the adjustable elevation pet food feeder mechanism 1000 of FIGS. 34-37 illustrating the first scissor lift 1101 and the second scissor lift 1102 in a collapsed position to lower the pet food bowl supporting tray 1020.

Figure 41:
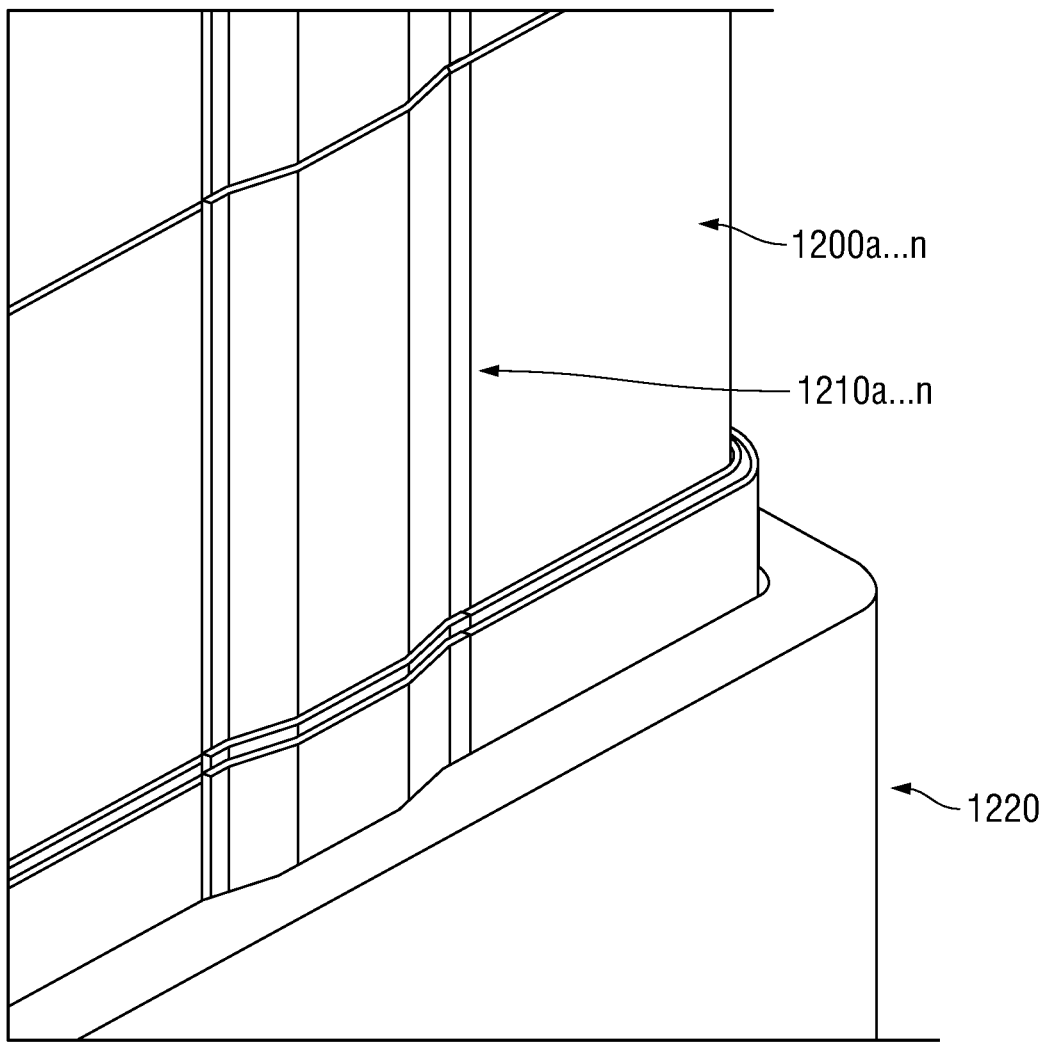
FIG. 41 is a perspective view in an elevated position of a portion of the telescoping shields of the adjustable elevation pet food feeder mechanism of FIGS. 34-40.

FIG. 41 is a perspective view in an elevated position of a portion of the telescoping shields 1200a, 1200b, 1200c, 1200d, 1200e of the adjustable elevation pet food feeder mechanism 1000 of FIGS. 34-40 wherein the linear guides or connectors 1210a . . . 1210e enable the telescoping shields 1200a, 1200b, 1200c, 1200d, 1200e to properly extend and to maintain the pet food bowl supporting tray 1020 in the elevated position.

Figure 42:
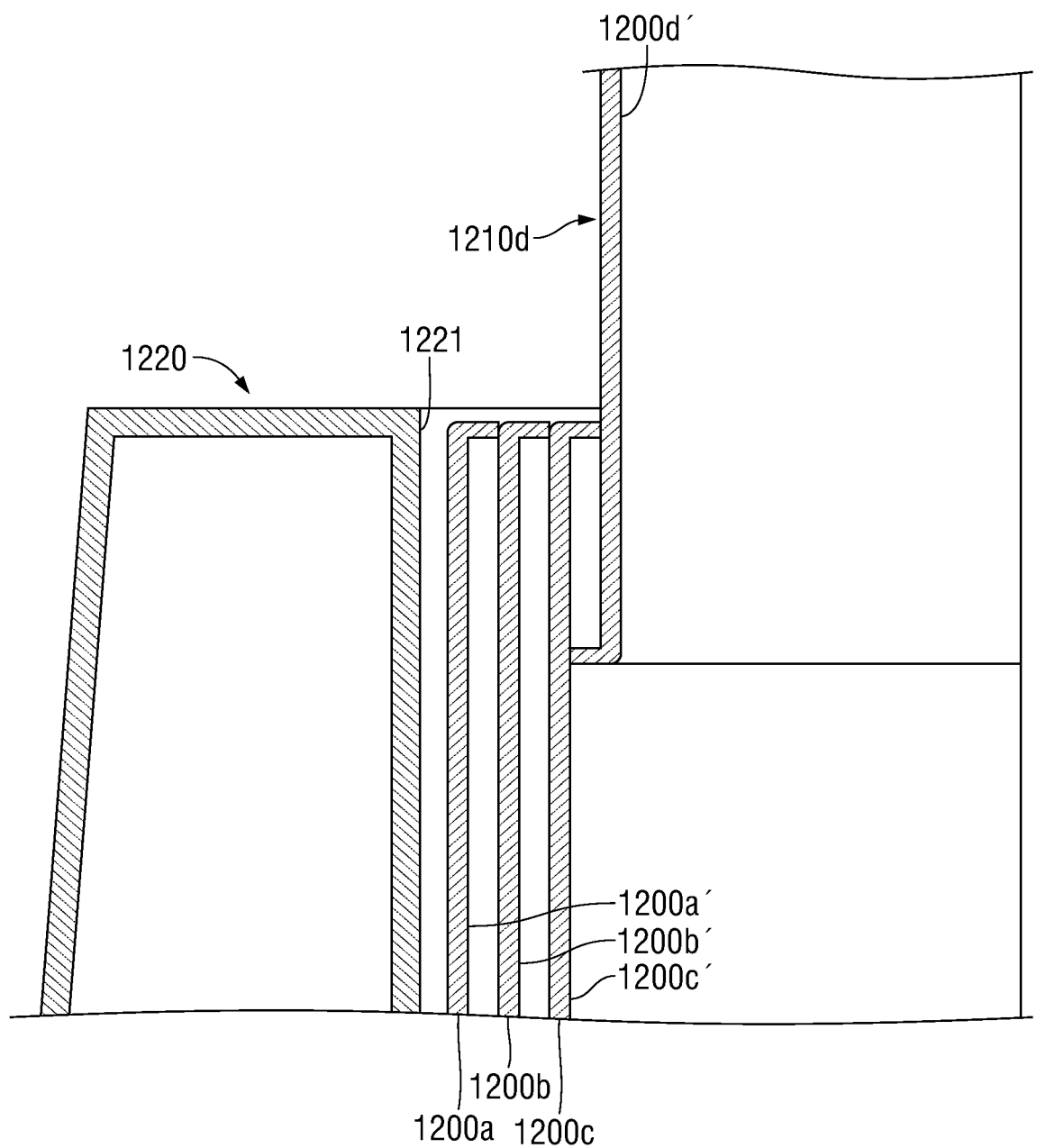
FIG. 42 is a cross-sectional view of the telescoping shields wherein a portion of the telescoping shields are in a lowered position in the support tray and a portion in an elevated position.

FIG. 42 is a cross-sectional view of the telescoping shields 1200a-1200d wherein a portion of the telescoping shields, i. e., 1200a-1 are in a lowered position in the support tray and a portion in an elevated position As described above, the first of the plurality of telescoping shields 1200a is configured to interface with the inner periphery 1221 and defines inner surface 1200a'. The second of the plurality of telescoping shields 1200b extends around the inner surface 1200a' of the first of the plurality of telescoping shields 1200a and each subsequent telescoping shield 1200c, 1200d as shown for illustration, wherein fifth shield 1200e is not shown, extends around the inner surface 1200b', 1200c', 1200d' of the prior telescoping shield 1200b, 1200c, 1200d. The final telescoping shield 1200e, not shown, extends to contact the pet food bowl supporting tray 1020.

Figure 43:
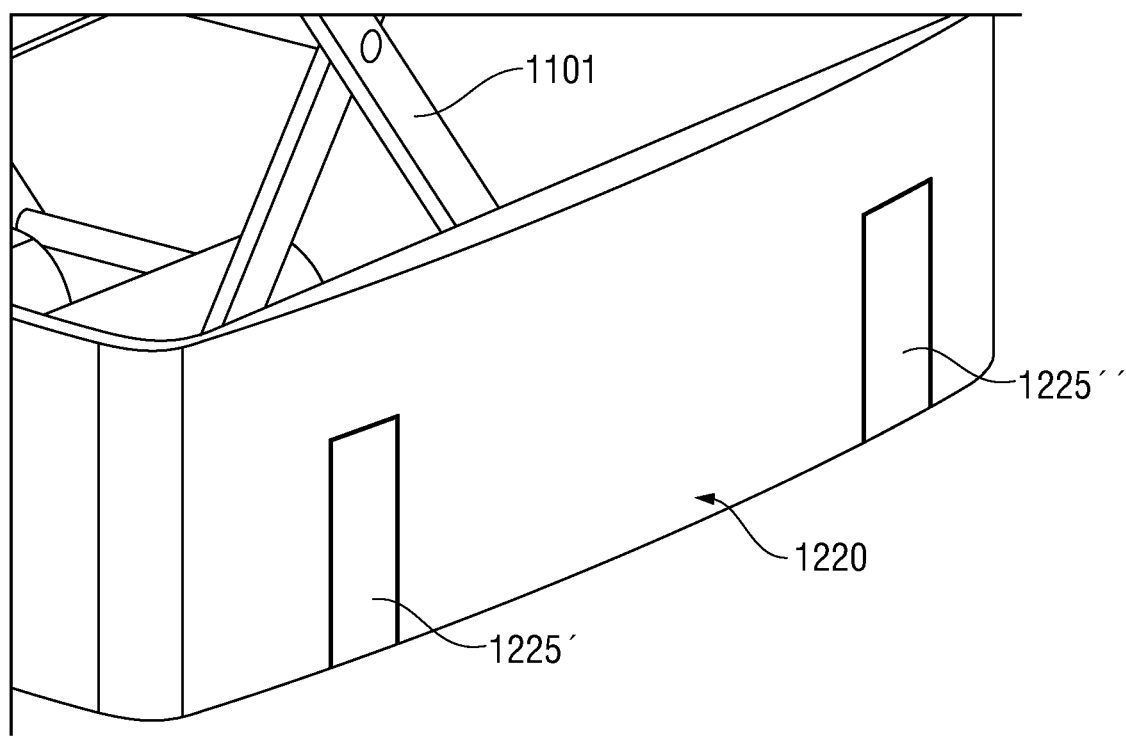
FIG. 43 is a perspective view of the support tray for the adjustable elevation pet food feeder mechanisms having stabilization legs in an elevated position in the support tray.

FIG. 43 is a perspective view of the support tray 1220 for the adjustable elevation pet food feeder mechanisms having stabilization legs 1225' and 1225" in an elevated position in the support tray 1220. Stabilization legs 1225' and 1225" may be included on an optional basis since the weight of the actuating mechanisms represented by actuating mechanism 14 in FIG. 1 may preclude the need for the stabilization legs 1225' and 1225".

Figure 44:
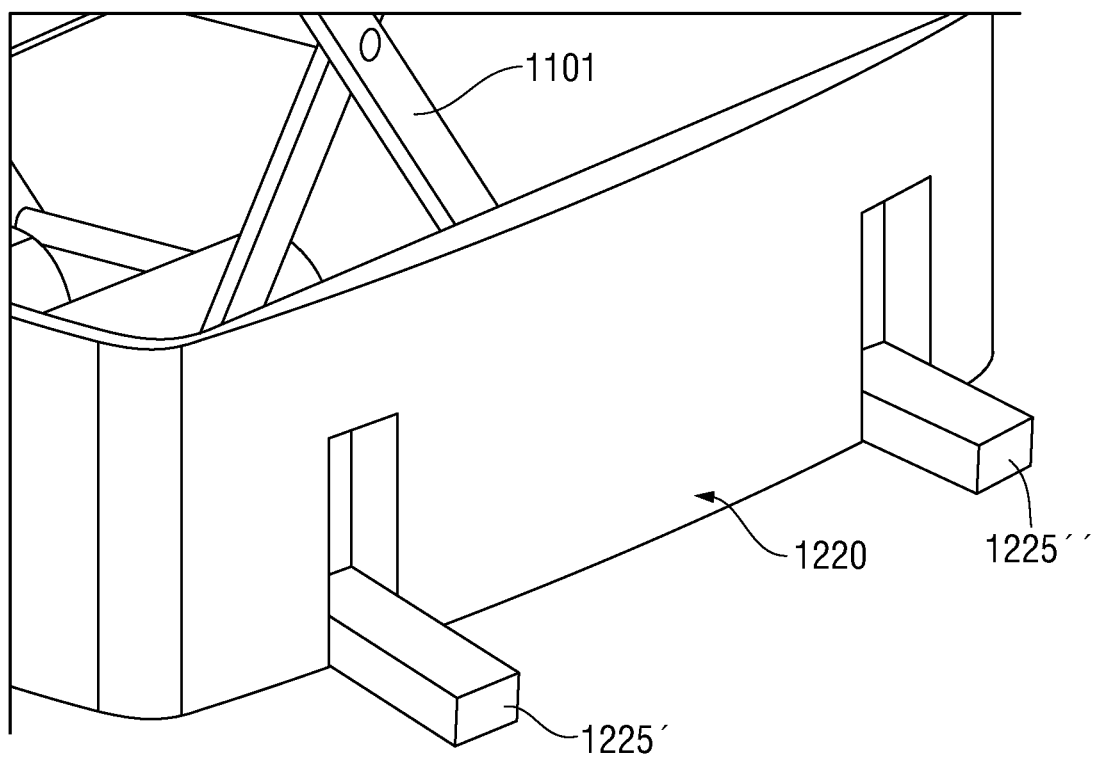
FIG. 44 is a perspective view of the support tray of FIG. 43 wherein the stabilization legs are in a lowered position with respect to the support tray to enable stabilization of the adjustable elevation pet food feeder mechanisms.

FIG. 44 is a perspective view of the support tray 1220 of FIG. 43 wherein the stabilization legs 1225' and 1225" are in a lowered position with respect to the support tray 1220 to enable stabilization of the adjustable elevation pet food feeder mechanisms 10 of FIG. 1.

Figure 45:
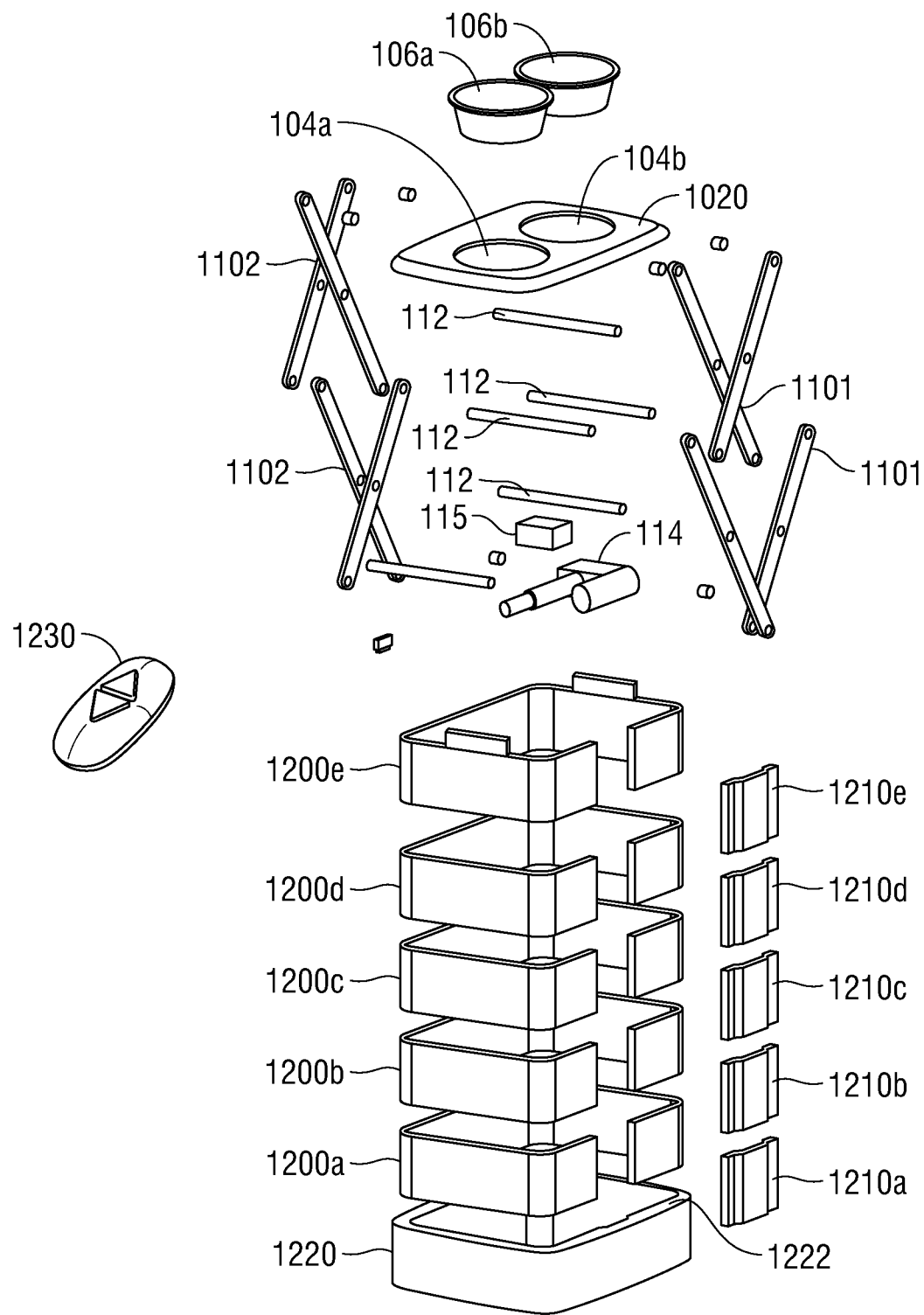
FIG. 45 is an exploded perspective view of the adjustable elevation pet food feeder mechanism of FIGS. 34-44.

FIG. 45 is an exploded perspective view of the adjustable elevation pet food feeder mechanism 1000 of FIGS. 4-13 and FIGS. 34-44. As further explained below, a radio-frequency transmitter 1230 is also shown; this is part of the actuating mechanism control 16 of FIG. 1.

Figure 46:
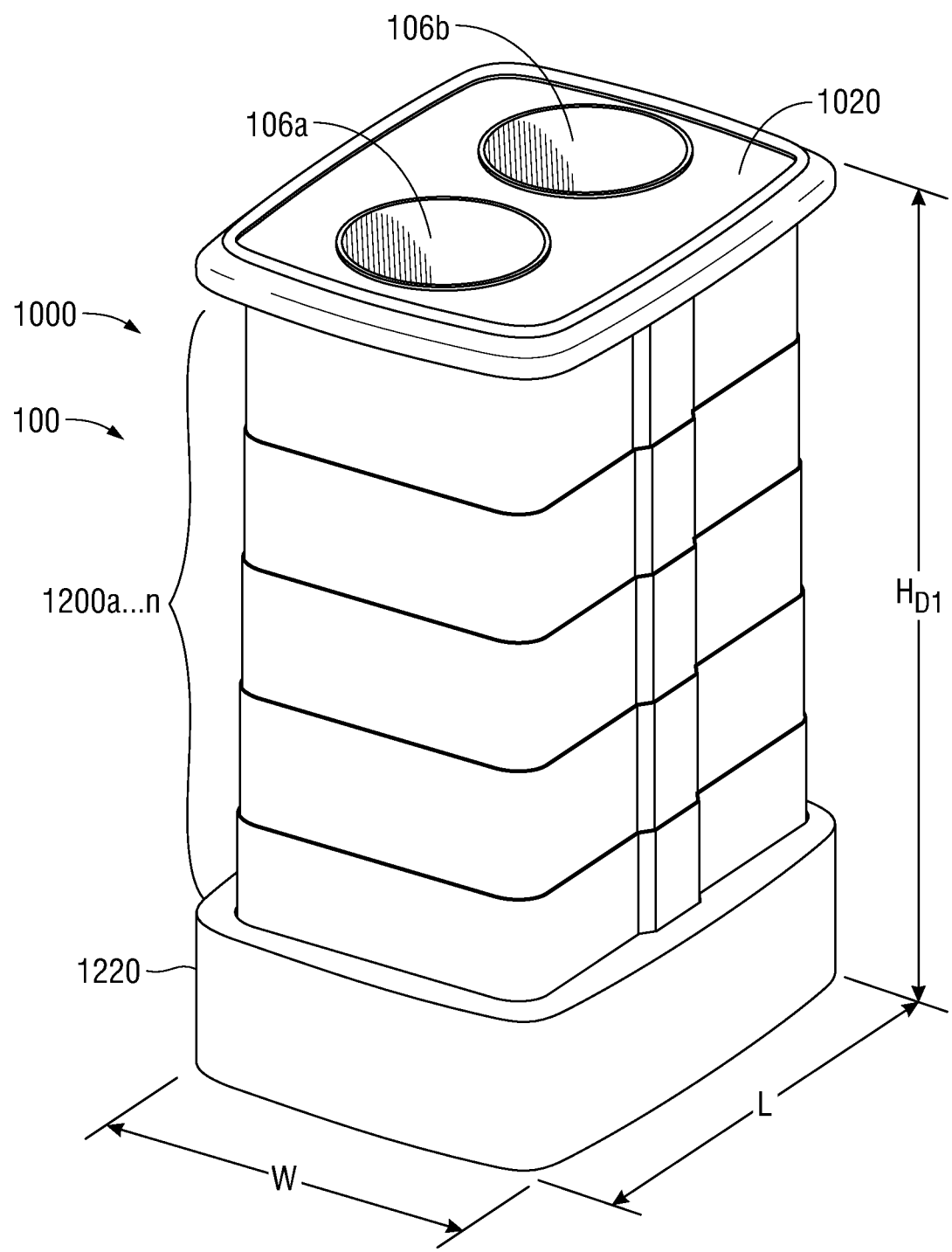
FIG. 46 is a perspective view of the adjustable elevation pet food feeder mechanism of FIGS. 34-45.

FIG. 46 is a perspective view of the adjustable elevation pet food feeder mechanism 1000 of FIGS. 34-45.

Those skilled in the art will recognize and understand how the telescoping shields 1200a . . . 1200n and the associated components such as the connectors 1210a . . . 1210e, the linear guides 1211a . . . 1211e and linear guides 1212a . . . 1212e may be applied to the other aspects of the present disclosure of pet food devices such as shown and described above with respect to FIGS. 14-33. The telescoping shields 1200a . . . 1200n and the associated components such as the connectors 1210a . . . 1210e, the linear guides 1211a . . . 1211e and linear guides 1212a . . . 1212e as applied to any of the aspects of the present disclosure, or to other devices, either within the art of pet food devices or in other fields of endeavor, having a configuration that can accommodate the telescoping shields 1200a . . . 1200n and the associated components, provide significant and non-obvious advantages over the prior art by protecting against damage and interference in operation caused by the pet such as by chewing and by preventing the actuating mechanisms from being exposed not only to the pet but also to pet food and other debris.

As a consequence of the scissor lift configuration of the pet food device 100, referring to FIGS. 34, 37, 38, 39, 40 and 46, the actuating mechanism effects the elevating of and lowering of the pet food bowl supporting tray in a height dimension $H_{D1}$-$H_{D2}$ over a period of time $\Delta T$ in a time dimension of at least 3 centimeters/second (cm/sec) to define a minimum velocity V of elevating and lowering the pet food bowl supporting tray.

In a period of equal to or less than 20 seconds over a height differential of equal to or greater than 60 centimeters (cm), the pet food device 100 transfers between an elevated position and a lowered position to define an average minimum velocity of the height differential of 60 centimeters over a period of 20 seconds or at least 3 cm/sec.

The actuating mechanism supporting tray may be configured with an average area A' of length L multiplied by width W wherein A' may be not greater than 2700 sq. centimeters. Thus, the average area A' divided by the minimum velocity V of elevating and lowering the pet food bowl supporting tray of 3 cm/sec may be not greater than 900 centimeter-seconds.

This speed of operation provides significant and non-obvious advantages over the prior art, thereby saving significant time and effort for the user. In addition, the comparatively small footprint of the devices as compared to the prior art thereby requires less space in the location of use and thus reduces the weight of the devices which the user is required to shift or lift or transport.

Figure 47:
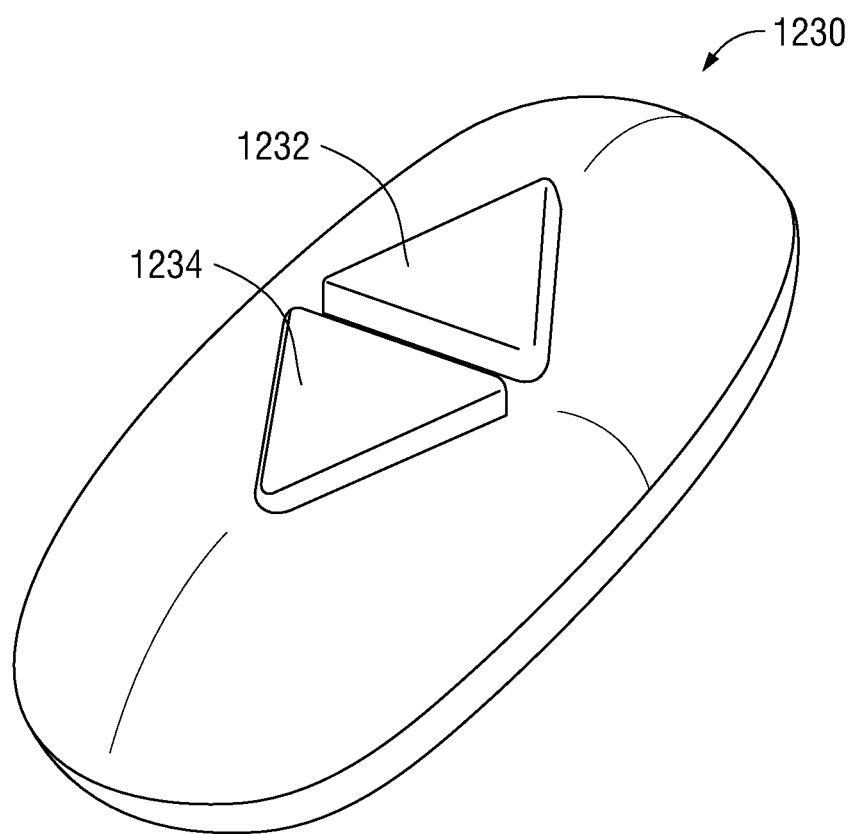
FIG. 47 is a perspective view of a remote controller for the adjustable elevation pet food feeders of FIGS. 1-46 according to an aspect of the present disclosure.

In an aspect of the present disclosure, FIG. 47 is a perspective view of actuating mechanism control 16 of FIG. 1 in the form of remote controller 1230 for the adjustable elevation pet food feeder devices 10 of FIGS. 1-46. Via a power supply, such as power cord 114' in FIG. 35, power is supplied to the actuating mechanism 14 in FIG. 1, e. g, linear actuator 114 in FIG. 35 via a power control switch (not shown) that is included with the linear actuator 114, and radio-frequency receiver 115 that is in communication with the power control switch to enable control of the actuating mechanism 114 via radio-frequency transmitter 1230 communicating a signal to the power control switch via the radio-frequency receiver 115 to at least partially elevate or at least partially lower the pet food bowl supporting tray 1020. When the user presses "RAISE" button 1232, a control signal is transmitted to the radio-frequency receiver 115 to elevate the pet food feeder device 10. Conversely, when the user presses "LOWER" button 1234, a control signal is transmitted to the radio-frequency receiver 115 to lower the pet food feeder device 10. In an aspect of the present disclosure, FIG. 48 illustrates wherein the actuating mechanism control 16 of FIG. 1 is in the form of a mobile device 1240 having a software application which enables raising and lowering the adjustable elevation pet food feeder devices 10 of FIGS. 1-46. Again, via a power supply, such as power cord 114' in FIG. 35, power is supplied to the actuating mechanism 14 in FIG. 1, e. g, linear actuator 114 in FIG. 35 via a power control switch (not shown) that is included with the linear actuator 114, and radio-frequency receiver 115 that is in communication with the power control switch to enable control of the actuating mechanism 114 to the actuating mechanism including a power control switch; and a computing device 20 in FIG. 2 including a processor 24 and a memory 21 storing instructions which, when executed by at least one processor 24, causes the computing device 20, e.g., mobile device 1240 in FIG. 48, to communicate instructions to radio-frequency receiver 115 that is in communication with the power control switch (not shown) in the linear actuator 114 to enable control of the actuating mechanism 14, e. g., linear actuator 114, by communicating a signal to the power control switch via the radio-frequency receiver 115 to at least partially elevate or at least partially lower the pet food bowl supporting tray 1020 in FIGS. 34-42. When the user presses "RAISE" button 1232', a control signal is transmitted to the radio-frequency receiver 115 to elevate the pet food feeder device 10. Conversely, when the user presses "LOWER" button 1234', a control signal is transmitted to the radio-frequency receiver 115 to lower the pet food feeder device 10.

Figure 3:
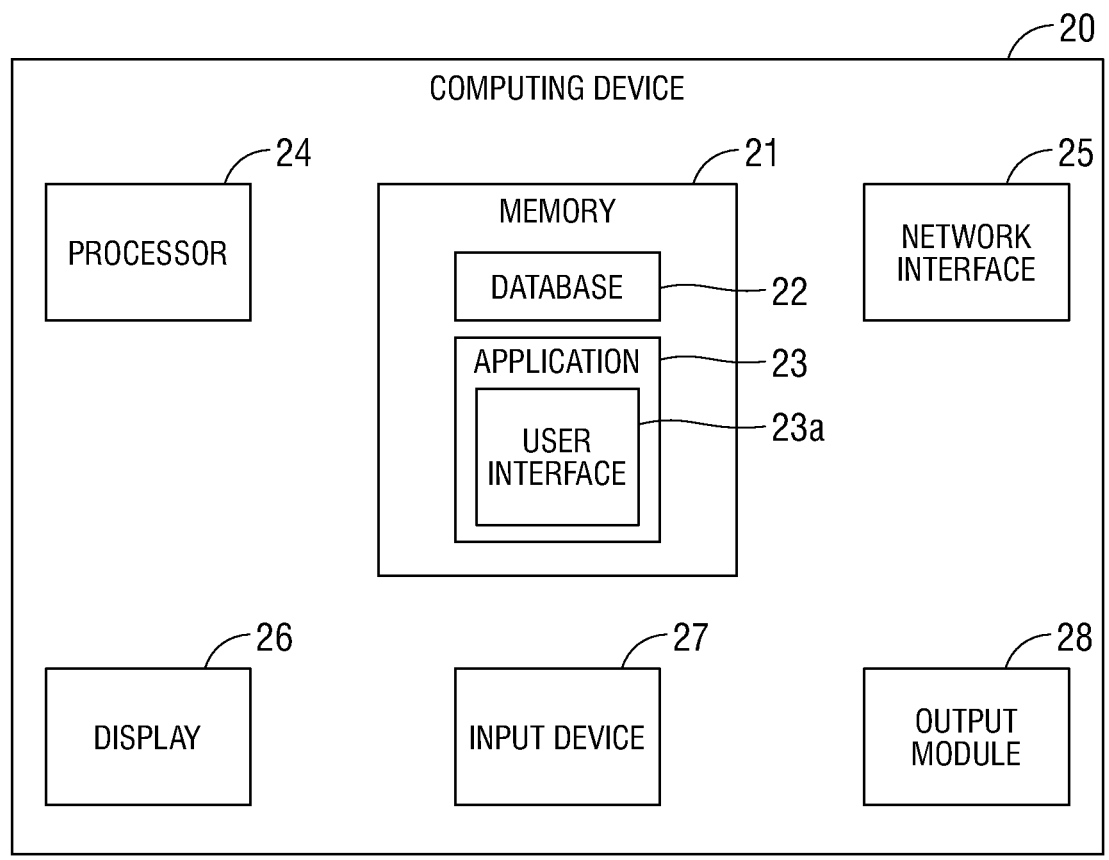
FIG. 3 is a simplified box diagram of an exemplary computing device forming part of the system of FIG. 2.

Regarding FIG. 3, as noted above, user device 10 and computing device 20 may each be a distinct device, or may be a single device performing the functions of both devices. For purposes of clarity, the examples described herein refer to user device 10 and computing device 20 as distinct devices. However, these examples are not intended to be limiting, and those skilled in the art will recognize that the same or similar functions described below may be performed by a single, unified device.

FIG. 49 is a view of the mobile device 1240 of FIG. 48 illustrating specific actuation features 1236 enabled by the software application. The actuation features 1236 may include: "Manual Mode" for raising and lowering the pet food bowl supporting tray 1020 in FIG. 34-42, a "Time Presets" feature, a "Feed Time Reminders" feature, a "Height Presets" feature, and a "Settings" feature.

FIG. 50 is a view of the mobile device 1240 of FIG. 49 wherein the user has selected to adjust the specific actuation features enabled by the software application of "Time Preset" 1242 that is included in the actuation features 1236.

FIG. 51 is view of time settings 1244 for the software application to lower and raise the adjustable elevation pet food feeders of FIGS. 1-46. Time settings 1244 include "Lower Bowl—8:15 AM", "Raise Bowl—9:00 AM", "Lower Bowl—6:00 PM" and "Raise Bowl—6:45 AM".

FIG. 52 is a view of additional settings for the software application wherein setting 1248 includes "Feed Dog—Everyday @5:45 pm" to feed a pet or setting 1250 "Give Dog Heartworm Meds." to give medications.

FIG. 53 is a view of additional settings enabled by the software application wherein setting 1248 "Feed Dog—Everyday @8:00 am" includes setting 1252 "Buy Dog Feed" to purchase pet food and setting 1254 "Redeem 10% Off-Coupon".

While the pet food feeders of FIGS. 1-46 have been shown to be controlled wirelessly remotely via a radio-frequency transceiver system or an application via Wi-Fi, those skilled in the art will recognize and understand that other control means may be employed including hard-wired systems or optical systems or the like. The aspects are not limited in this context.

While several embodiments or aspects of the disclosure have been shown in the drawings, it is not intended that the disclosure be limited thereto, as it is intended that the disclosure be as broad in scope as the art will allow and that the specification be read likewise. Any combination of the above embodiments or aspects is also envisioned and is within the scope of the appended claims. Therefore, the above description should not be construed as limiting, but merely as exemplifications of particular embodiments or aspects. Those skilled in the art will envision other modifications within the scope of the claims appended hereto.

What is claimed is:

1. A pet food device comprising:
   a pet food bowl supporting tray configured with at least first and second receiving structures,
   the first and second receiving structures including an aperture or a hollow cavity depression, or combinations thereof,
   wherein each of the first and second receiving structures is configured to receive at least one pet food bowl;
   an actuating mechanism supporting tray; and
   an actuating mechanism disposed within the actuating mechanism supporting tray in operable communication with the pet food bowl supporting tray,
   wherein the actuating mechanism enables elevating concurrently the pet food bowl supporting tray above the actuating mechanism supporting tray and at least one of a plurality of telescoping shields which are configured and disposed to shield the actuating mechanism supporting tray from the environs and enables lowering concurrently the pet food bowl supporting tray and the at least one of the plurality of telescoping shields to interface with the actuating mechanism supporting tray, the actuating mechanism including a scissor lift movable structure in operable communication with the pet food bowl supporting tray and with the actuating mechanism, the scissor lift movable structure and the actuating mechanism effecting thereby the elevating of and lowering of the pet food bowl supporting tray,
   the scissor lift movable structure operably coupled to the pet food bowl supporting tray such that the first receiving structure at least partially projects away from the scissor lift movable structure and at least partially overhangs the actuating mechanism supporting tray when the pet food bowl supporting tray is in an elevated position;
   wherein the actuating mechanism supporting tray defines an inner periphery,
   the pet food device comprising the plurality of telescoping shields configured as sequentially interlocking panels extending around the inner periphery of the actuating mechanism supporting tray.

2. The pet food device according to claim 1, wherein the actuating mechanism includes a linear actuator in operable communication with a connecting rod member, the connecting rod member in operable communication with the scissor lift movable structure wherein movement of the connecting rod member by the linear actuator effects the elevating of and lowering of the pet food bowl supporting tray.

3. The pet food device according to claim 1, wherein the actuating mechanism effects the elevating of and lowering of the pet food bowl supporting tray in a height dimension over a period of time in a time dimension to define a minimum velocity of elevating and lowering the pet food bowl supporting tray of at least 3 centimeters/second (cm/sec).

4. The pet food device according to claim 3, wherein the actuating mechanism supporting tray is configured with an average area of length multiplied by width and wherein the average area divided by the minimum velocity of elevating and lowering the pet food bowl supporting tray is not greater than 900 centimeter-seconds.

5. The pet food device according to claim 1,
wherein the first of the plurality of telescoping shields is configured to interface with the inner periphery of the actuating mechanism supporting tray, the first of the plurality of telescoping shields defines an inner surface, the second of the plurality of telescoping shields extends around the inner surface of the first of the plurality of telescoping shields and each subsequent telescoping shield extends around the inner surface of the prior telescoping shield, the final telescoping shield extending to contact the pet food bowl supporting tray.

6. The pet food device according to claim 5,
wherein the plurality of telescoping shields each define a gap in extending around the inner surface of the prior telescoping shield,
the pet food device comprising a plurality of connectors corresponding to the plurality of telescoping shields, the plurality of connectors each configured to span the gap in extending around the inner surface of the prior telescoping shield,
the connectors configured as linear guides that guide the telescoping shields to extend from a lowered position of the pet food device to an elevated position of the pet food device.

7. The pet food device according to claim 1, wherein the actuating mechanism supporting tray includes at least one anti-tipping structure configured to provide resistance to overturning of the pet food device.

8. The pet food device according to claim 7, wherein the at least one anti-tipping structure is configured as at least one rotatable stabilization leg which is configured and disposed to rotate from a non-use position to an in-use position wherein, in the in-use position, the at least one stabilization leg projects from a side wall of the actuating mechanism supporting tray.

9. The pet food device according to claim 1, comprising:
a power supply to the actuating mechanism including a power control switch; and a radio-frequency receiver in communication with the power control switch to enable control of the actuating mechanism via a radio-frequency transmitter communicating a signal to the power control switch via the radio-frequency receiver to at least partially elevate or at least partially lower the pet food bowl supporting tray.

10. The pet food device according to claim 1, comprising:
a power supply to the actuating mechanism including a power control switch; and a computing device including a processor and a memory storing instructions which, when executed by at least one processor, causes the computing device to communicate instructions to a radio-frequency receiver in communication with the power control switch to enable control of the actuating mechanism by communicating a signal to the power control switch via the radio-frequency receiver to at least partially elevate or at least partially lower the pet food bowl supporting tray.

11. The pet food device according to claim 10, wherein the computing device including the processor and the memory store instructions which, when executed by at least one processor, causes the computing device to establish one of time presets or feed time reminders or height presets or settings or combinations thereof.

12. The pet food device according to claim 11, wherein the time presets include one of at least one time to elevate the pet food bowl supporting tray or to lower the pet food bowl supporting tray or combinations thereof.

13. The pet food device according to claim 11, wherein the feed time reminders include at least one time to feed a pet or at least one time to provide medications to a pet or at least one time to procure pet food or combinations thereof.

14. A pet food device comprising:
a pet food bowl supporting tray configured with at least-first and second receiving structures,
the first and second receiving structures including an aperture or a hollow cavity depression, or combinations thereof,
wherein each of the first and second receiving structures is configured to receive at least one pet food bowl;
an actuating mechanism supporting tray; and
an actuating mechanism disposed within the actuating mechanism supporting tray in operable communication with the pet food bowl supporting tray,
wherein the actuating mechanism enables elevating the pet food bowl supporting tray above the actuating mechanism supporting tray and lowering the pet food bowl supporting tray to interface with the actuating mechanism supporting tray, and
wherein the actuating mechanism includes a scissor lift movable structure in operable communication with the pet food bowl supporting tray and with the actuating mechanism, the scissor lift movable structure and the actuating mechanism effecting thereby the elevating of and lowering of the pet food bowl supporting tray,
the scissor lift movable structure operably coupled to the pet food bowl supporting tray such that the first receiving structure at least partially projects away from the scissor lift movable structure and at least partially overhangs the actuating mechanism supporting tray when the pet food bowl supporting tray is in an elevated position,
wherein the actuating mechanism enables elevating concurrently the pet food bowl supporting tray above the actuating mechanism supporting tray and at least one of a plurality of telescoping shields which are configured and disposed to shield the actuating mechanism supporting tray from the environs and enables lowering concurrently the pet food bowl supporting tray and the plurality of telescoping shields to interface with the actuating mechanism supporting tray, and
wherein the actuating mechanism supporting tray defines an inner periphery,
the pet food device comprising the plurality of telescoping shields configured as sequentially interlocking panels extending around the inner periphery of the actuating mechanism supporting tray, the first of the plurality of telescoping shields configured to interface with the inner periphery of the actuating mechanism supporting tray, the first of the plurality of telescoping shields defining an inner surface, the second of the plurality of telescoping shields extending around the inner surface of the first of the plurality of telescoping shields and each subsequent telescoping shield extending around the inner surface of the prior telescoping shield, the final telescoping shield extending to contact the pet food bowl supporting tray.

15. The pet food device according to claim 14, wherein the actuating mechanism includes a linear actuator in operable communication with a connecting rod member, the connecting rod member in operable communication with the scissor lift movable structure wherein movement of the connecting rod member by the linear actuator effects the elevating of and lowering of the pet food bowl supporting tray.

16. The pet food device according to claim 14, wherein the actuating mechanism effects the elevating of and lowering of the pet food bowl supporting tray in a height dimension over a period of time in a time dimension to define a minimum velocity of elevating and lowering the pet food bowl supporting tray of at least 3 centimeters/second (cm/sec).

17. The pet food device according to claim 16, wherein the actuating mechanism supporting tray is configured with an average area of length multiplied by width and wherein the average area divided by the minimum velocity of elevating and lowering the pet food bowl supporting tray is not greater than 900 centimeter-seconds.

18. The pet food device according to claim 14,
wherein the plurality of telescoping shields each define a gap in extending around the inner surface of the prior telescoping shield,
the pet food device comprising a plurality of connectors corresponding to the plurality of telescoping shields, the plurality of connectors each configured to span the gap in extending around the inner surface of the prior telescoping shield,
the connectors configured as linear guides that guide the telescoping shields to extend from a lowered position of the pet food device to an elevated position of the pet food device.

19. The pet food device according to claim 14, wherein the actuating mechanism supporting tray includes at least one anti-tipping structure configured to provide resistance to overturning of the pet food device.

20. The pet food device according to claim 19, wherein the at least one anti-tipping structure is configured as at least one rotatable stabilization leg which is configured and disposed to rotate from a non-use position to an in-use position wherein, in the in-use position, the at least one stabilization leg projects from a side wall of the actuating mechanism supporting tray.

* * * * *